US012664639B2

(12) United States Patent
Sekiguchi et al.

(10) Patent No.: US 12,664,639 B2
(45) Date of Patent: Jun. 23, 2026

(54) INFORMATION PROCESSING APPARATUS, NON-TRANSITORY COMPUTER READABLE MEDIUM, AND METHOD

(71) Applicant: FUJIFILM Business Innovation Corp., Tokyo (JP)

(72) Inventors: Yumi Sekiguchi, Kanagawa (JP); Atsushi Ogihara, Kanagawa (JP); Tomonari Takahashi, Kanagawa (JP); Ryosuke Higashikata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/311,287

(22) Filed: May 3, 2023

(65) Prior Publication Data

US 2024/0087106 A1 Mar. 14, 2024

(30) Foreign Application Priority Data

Sep. 8, 2022 (JP) ................................. 2022-142990

(51) Int. Cl.
*G06T 17/00* (2006.01)
*G06T 7/00* (2017.01)
(52) U.S. Cl.
CPC ............ *G06T 7/0004* (2013.01); *G06T 17/00* (2013.01); *G06T 2207/10028* (2013.01); *G06T 2207/30164* (2013.01)

(58) Field of Classification Search
None
See application file for complete search history.

(56) References Cited

U.S. PATENT DOCUMENTS

2018/0330042 A1* 11/2018 Byers ...................... G06F 30/17
2023/0306760 A1* 9/2023 Higashikata ............ G06T 19/00

FOREIGN PATENT DOCUMENTS

| JP | H07-104827 | A | | 4/1995 | |
|----|------------|---|---|--------|---|
| JP | 2001331535 | | * | 11/2001 | ........... G05B 19/418 |
| JP | 2002-328952 | A | | 11/2002 | |
| JP | 3545271 | | * | 7/2004 | ............ G06F 17/50 |
| JP | 2022105917 | | * | 7/2022 | ............ G06F 30/10 |

* cited by examiner

*Primary Examiner* — Beniyam Menberu
(74) *Attorney, Agent, or Firm* — Oliff PLC

(57) ABSTRACT
An information processing apparatus includes a processor configured to: determine a relationship between plural pieces of product manufacturing information included in two-dimensional drawing data and generate, on a basis of the determined relationship, first information indicating the relationship between the plural pieces of product manufacturing information; determine a relationship between a plural pieces of product manufacturing information included in three-dimensional drawing data and generate, on a basis of the determined relationship, second information indicating the relationship between the plural pieces of product manufacturing information; and detect a difference between the first information and the second information by identifying correspondence between the first information and the second information.

13 Claims, 39 Drawing Sheets

FIG. 11

| IDENTIFICATION NUMBER | TYPE | VALUE | TED OR NOT | RELATED FORMS |
|---|---|---|---|---|
| 41 | TED | 50 | YES | FORM 51, FORM 52 |
| 42 | SIZE TOLERANCE | 3 | NO | FORM 51, FORM 52 |
| 43 | GEOMETRICAL TOLERANCE | 0. 1 | NO | FORM 51, FORM 52 |
| 44 | SIZE TOLERANCE | 7. 5 | NO | (OMITTED) |
| 45 | BALLOON SYMBOL | 79 | NO | — |
| 46 | CALIPER INSTRUCTION | — | NO | — |

FIG. 12

SIZE TOLERANCE 42
(PARENT)

GEOMETRICAL TOLERANCE 43
(CHILD)

GEOMETRICAL TOLERANCE 43
(PARENT)

TED 41
(CHILD)

FIG. 13

SIZE TOLERANCE 44
(PARENT)

CALIPER
INSTRUCTION 46
(CHILD)

BALLOON
SYMBOL 45
(CHILD)

| IDENTIFICATION NUMBER | TYPE | VALUE | IDENTIFICATION NUMBER OF PARENT PMI | IDENTIFICATION NUMBER OF CHILD PMI |
|---|---|---|---|---|
| 41 | TED | 50 | 43 | — |
| 42 | SIZE TOLERANCE | 3 | — | 43 |
| 43 | GEOMETRICAL TOLERANCE | 0.1 | 42 | 41 |
| 44 | SIZE TOLERANCE | 7.5 | — | 45, 46 |
| 45 | BALLOON SYMBOL | 79 | 44 | — |
| 46 | CALIPER INSTRUCTION | — | 44 | — |

FIG. 16

| IDENTIFICATION NUMBER | TYPE | FEATURE AND MEANING | ENTITY TYPE IN DXF DATA |
|---|---|---|---|
| 61 | SIZE TOLERANCE | DIMENSION SUCH AS LENGTH, ANGLE, OR DIAMETER | DIMENSION |
| 62 | GEOMETRICAL TOLERANCE | IN GEOMETRICAL TOLERANCE FRAME | TOLERANCE |
| 63 | TED | DIMENSION IN RECTANGLE WITHOUT TOLERANCE | DIMENSION |
| 64 | DATUM TARGET | INDICATES POSITION OF DATUM | INSERT |
| 65 | NOTE FLAG | NUMBER IN PENTAGON | INSERT |
| 66 | CALIPER INSTRUCTION | I OR L IN TRIANGLE | INSERT |
| 67 | DESIGN CHANGE SYMBOL | INDICATES DESIGN CHANGE WITH THREE-DIGIT NUMBER IN TRIANGLE | INSERT |
| 68 | BALLOON SYMBOL | INDICATES ORDER OF INSPECTION WITH NUMBER IN CIRCLE | INSERT |

X: NOTE FLAG, CALIPER INSTRUCTION, DESIGN CHANGE SYMBOL, OR BALLOON SYMBOL

FIG. 23

EXAMPLE OF VALUES OBTAINED FROM TWO-DIMENSIONAL DRAWING DATA AND GROUPED

| GROUP ID | PARENT-CHILD RELATIONSHIP ID | PMI ID | PMI TYPE | TOLERANCE TYPE | NOMINAL VALUE | UPPER TOLERANCE LIMIT VALUE | LOWER TOLERANCE LIMIT VALUE | FLAG VALUE | PARENT PMI ID | REFERENCE COORDINATES |
|---|---|---|---|---|---|---|---|---|---|---|
| G2-1 | P2-11 | 3D3 | SIZE TOLERANCE | DIAMETER | 4.0 | 0.085 | -0.010 | - | - | (515.9, 529.7) |
| G2-1 | P2-11 | 465 | GEOMETRICAL TOLERANCE | POSITION | 0.0 | 0.3 | - | - | 3D3 | (515.9, 505.6) |
| G2-1 | P2-11 | 455 | FLAG | - | - | - | - | 7 | 3D3 | (515.9, 535.8) |
| G2-1 | P2-28 | 3FE | SIZE TOLERANCE | DIAMETER | 4.0 | 0.085 | -0.010 | - | - | (161.4, 402.9) |
| G2-1 | P2-28 | 468 | GEOMETRICAL TOLERANCE | POSITION | 0.0 | 0.3 | - | - | 3FE | (161.4, 378.9) |
| G2-1 | P2-28 | 3C8 | FLAG | - | - | - | - | 7 | 3FE | (161.4, 475.3) |
| G2-2 | P2-21 | 463 | SIZE TOLERANCE | DIAMETER | 4.5 | 0.1 | -0.1 | - | - | (484.1, 563.3) |
| ... | ... | ... | ... | ... | ... | ... | ... | ... | ... | ... |

COMPARE

EXAMPLE OF VALUES OBTAINED FROM THREE-DIMENSIONAL DRAWING DATA AND GROUPED

| GROUP ID | PARENT-CHILD RELATIONSHIP ID | PMI ID | PMI TYPE | TOLERANCE TYPE | NOMINAL VALUE | UPPER TOLERANCE LIMIT VALUE | LOWER TOLERANCE LIMIT VALUE | FLAG VALUE | PARENT PMI ID | REFERENCE COORDINATES |
|---|---|---|---|---|---|---|---|---|---|---|
| G3-3 | P3-111 | 10705 | SIZE TOLERANCE | DIAMETER | 4.0 | 0.085 | -0.010 | - | - | (-31.3, 1.0, 2.0) |
| G3-3 | P3-111 | 10869 | GEOMETRICAL TOLERANCE | POSITION | 0.0 | 0.3 | - | - | 10705 | - |
| G3-3 | P3-111 | 10871 | FLAG | - | - | - | - | 7 | 10705 | - |
| G3-3 | P3-245 | 6630 | SIZE TOLERANCE | DIAMETER | 4.0 | 0.085 | -0.010 | - | - | (-63.3, 1.0, -17.5) |
| G3-3 | P3-245 | 6928 | GEOMETRICAL TOLERANCE | POSITION | 0.0 | 0.3 | - | - | 6630 | - |
| G3-3 | P3-245 | 6955 | FLAG | - | - | - | - | 7 | 6630 | - |
| G3-2 | P3-21 | 6448 | SIZE TOLERANCE | DIAMETER | 4.5 | 0.1 | - | - | - | (62.3, 0.0, -43.4) |
| ... | ... | ... | ... | ... | ... | ... | ... | ... | ... | ... |

FIG. 24

EXAMPLE OF 3D DRAWING DATA

SAME GROUP

EXAMPLE OF 2D DRAWING DATA

SAME GROUP

MATCH IN UNITS OF GROUP

FIG. 25

EXAMPLE OF 3D DRAWING DATA

EXAMPLE OF 2D DRAWING DATA

MATCH IN ONE-TO-ONE CORRESPONDENCE

FIG. 26

EXAMPLE OF 3D DRAWING DATA

EXAMPLE OF 2D DRAWING DATA

SAME GROUP

MATCH IN UNITS OF GROUP

FIG. 29

EXAMPLE OF 3D DRAWING DATA

1001

EXAMPLE OF 2D DRAWING DATA

1002

REFERENCE COORDINATES
IN ONE-TO-ONE CORRESPONDENCE

EXAMPLE OF 3D DRAWING DATA
(VERTICALLY INVERTED WITH RESPECT TO B-AXIS)

EXAMPLE OF 2D DRAWING DATA

CORRESPONDING
REFERENCE COORDINATES

INFORMATION PROCESSING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2022-142990 filed Sep. 8, 2022.

BACKGROUND

(i) Technical Field

The present disclosure relates to an information processing apparatus, a non-transitory computer readable medium, and a method.

(ii) Related Art

Japanese Unexamined Patent Application Publication No. 7-104827 discloses a process management system that creates, from design drawing information, inspection drawing information that serves as a reference for comparison and measurement information for controlling measurement means, that evaluates manufacturing errors on the basis of a result of measurement input from the measurement means and the inspection drawing information, and that creates inspection result information, which is obtained by comparing the inspection drawing information and the result of the measurement, in accordance with a desired display mode while associating the inspection result information with the design drawing information.

Japanese Unexamined Patent Application Publication No. 2002-328952 discloses a computer-aided design (CAD) apparatus that, for a CAD model to which created attribute information such as dimensions and size tolerances is added, groups the attribute information for and adds measurement information to each of operation steps and that inputs post-process utilization information in order to improve efficiency in a process performed after measurement.

SUMMARY

During these years, parts and products are usually designed in a manufacturing industry while creating three-dimensional models. Two-dimensional drawing data is sometimes created from three-dimensional drawing data, and two-dimensional drawings are printed on sheets of paper for use. Two-dimensional drawings printed on sheets of paper are often used especially on manufacturing sites where apparatuses such as personal computers are not available.

When a design is changed after a two-dimensional drawing is created, however, a difference is undesirably caused between three-dimensional drawing data and two-dimensional drawing data if the change is incorporated into the three-dimensional drawing data but the two-dimensional drawing data is left unchanged. When two-dimensional drawing data is corrected on a manufacturing site but the correction is not incorporated into three-dimensional drawing data, too, a difference is undesirably caused between the three-dimensional drawing data and the two-dimensional drawing data. If such a difference is not eliminated, mass-produced products might be undesirably manufactured without a change in design incorporated.

Aspects of non-limiting embodiments of the present disclosure relate to an information processing apparatus, a non-transitory computer readable medium, and a method capable of detecting a difference between three-dimensional drawing data and two-dimensional drawing data without requiring any effort by a user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: determine a relationship between a plurality of pieces of product manufacturing information included in two-dimensional drawing data and generate, on a basis of the determined relationship, first information indicating the relationship between the plurality of pieces of product manufacturing information; determine a relationship between a plurality of pieces of product manufacturing information included in three-dimensional drawing data and generate, on a basis of the determined relationship, second information indicating the relationship between the plurality of pieces of product manufacturing information; and detect a difference between the first information and the second information by identifying correspondence between the first information and the second information.

BRIEF DESCRIPTION OF THE DRAWINGS

An exemplary embodiment of the present disclosure will be described in detail based on the following figures, wherein:

FIG. 11 is a diagram illustrating an example of PMI detected from the three-dimensional drawing data illustrated in FIGS. 8 and 10;

FIG. 12 is a diagram illustrating a result of a determination as to a relationship between a size tolerance as a parent, geometrical tolerance, and theoretically exact dimension (TED);

FIG. 13 is a diagram illustrating a result of a determination as to a relationship between a size tolerance as a parent, a balloon symbol, and a caliper instruction;

FIG. 14 is a diagram illustrating an example of information indicating relationships between plural pieces of PMI;

FIG. 16 is a diagram illustrating a list of types of PMI included in the DXF data regarding the two-dimensional drawing illustrated in FIG. 15;

FIG. 23 is a diagram illustrating an example of grouped parent-child relationship sets;

FIG. 24 is a diagram illustrating an example of a case where parent-child relationship sets of PMI are in two-to-two correspondence between a 2D drawing and a 3D model;

FIG. 25 is a diagram illustrating an example of a case where parent-child relationship sets of PMI are in one-to-one correspondence between a 2D drawing and a 3D model;

FIG. 26 is a diagram illustrating an example of a case where parent-child relationship sets of PMI are in one-to-four correspondence between a 2D drawing and a 3D model;

FIG. 29 is a diagram illustrating how center coordinates of holes indicated by parent-child relationships of PMI in one-to-one correspondence between a 2D drawing and a 3D model are extracted as reference coordinates;

FIG. 32 is a diagram illustrating a case where there are parent-child relationship sets of PMI in one-to-four correspondence between a 2D drawing and a 3D model;

FIG. 33 is a diagram illustrating how the parent-child relationship sets of PMI in one-to-four correspondence are identified such that the parent-child relationship sets of PMI come into one-to-one correspondence;

FIG. 37 is a diagram illustrating a reason why parent-child relationship sets of PMI are identified such that the parent-child relationship sets come into one-to-one correspondence between a 2D drawing and a 3D model;

DETAILED DESCRIPTION

Next, an exemplary embodiment of the present disclosure will be described in detail with reference to the drawings.

Figure 1:
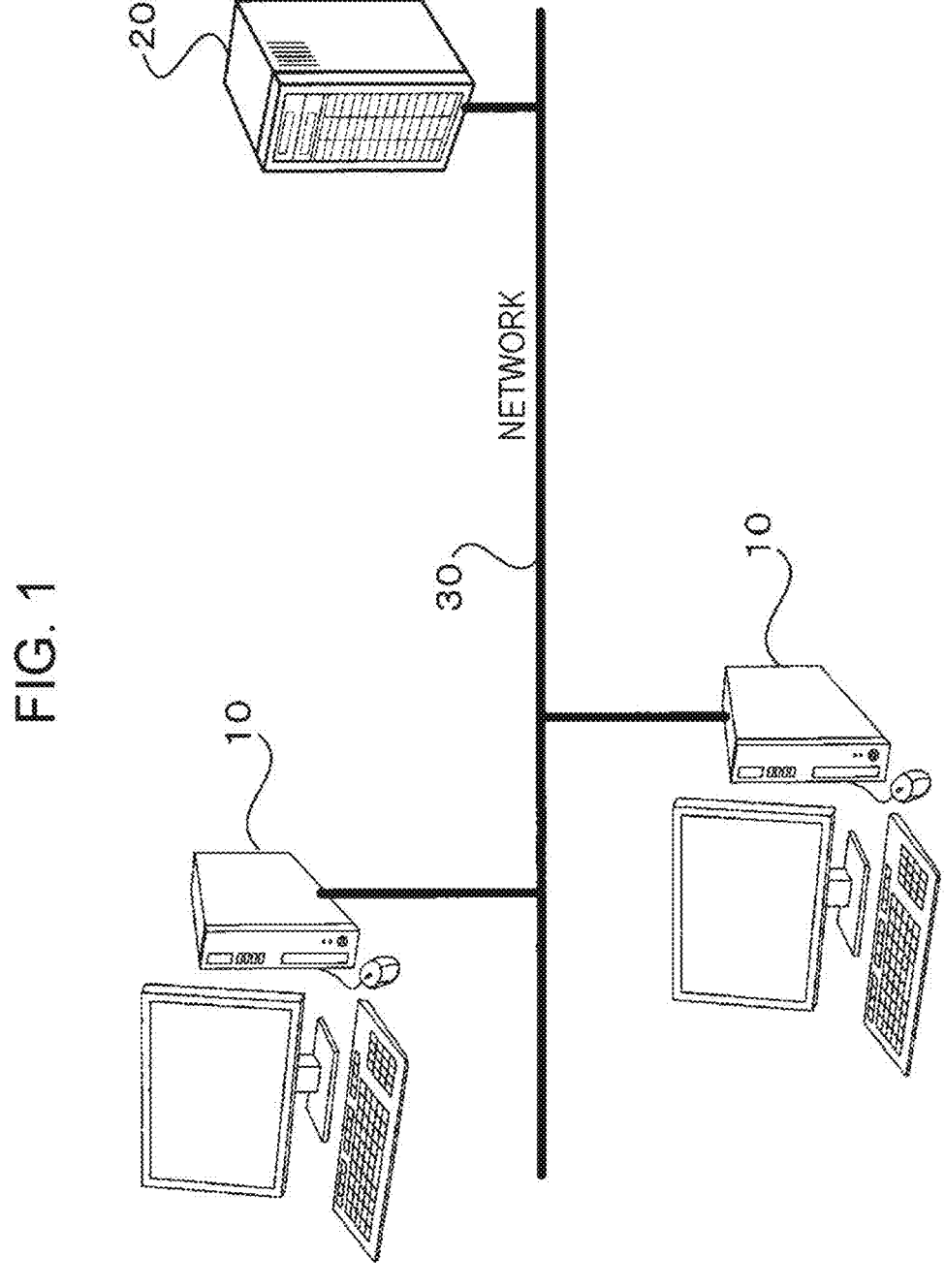
FIG. 1 is a diagram illustrating the system configuration of a drawing data processing system according to the exemplary embodiment of the present disclosure.

FIG. 1 is a diagram illustrating the system configuration of a drawing data processing system according to the exemplary embodiment of the present disclosure.

As illustrated in FIG. 1, the drawing data processing system according to the exemplary embodiment of the present disclosure includes plural terminal apparatuses 10 and a drawing data management server 20 connected to one another over a network 30. The drawing data management server 20 manages drawing data, such as part drawings and product drawings, for designing various products. The terminal apparatuses 10 are information processing apparatuses having functions of downloading and displaying the drawing data managed by the drawing data management server 20 and uploading downloaded drawing data to the drawing data management server 20 after performing various operations on the drawing data, such as correction and change.

Here, the drawing data managed by the drawing data management server 20 is, for example, three-dimensional drawing data including not only product shape information indicating shapes of products to be formed but also specification information such as nominal dimensions and tolerances as PMI. The drawing data management server 20 manages not only the three-dimensional drawing data but also two-dimensional drawing data generated on the basis of the three-dimensional drawing data.

Figure 2:
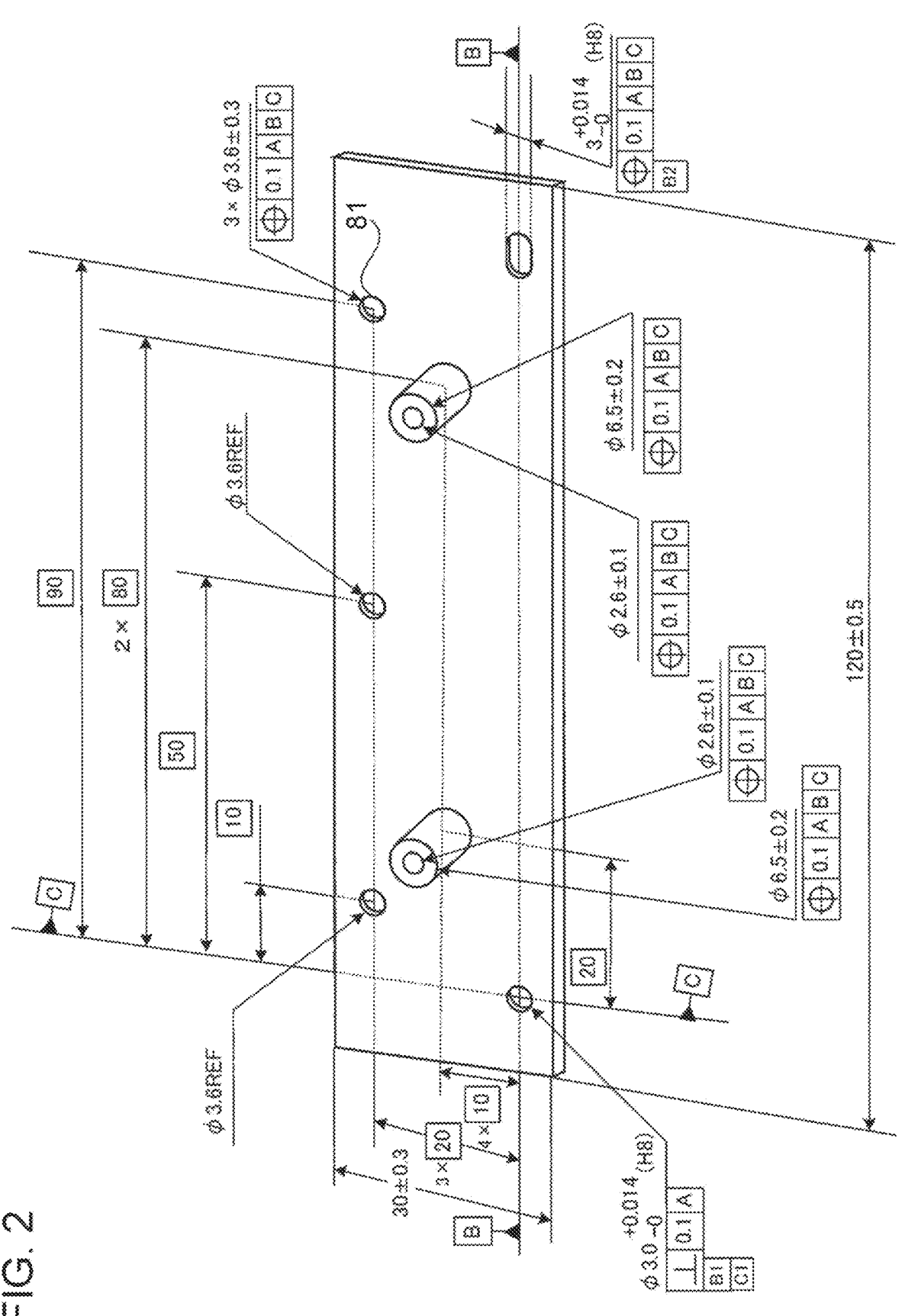
FIG. 2 is a diagram illustrating an example of three-dimensional drawing data including product manufacturing information (PMI)

FIG. 2 illustrates an example of three-dimensional model (abbreviated as "3D model") data including such PMI. In FIG. 2, various pieces of PMI such as size tolerances, geometrical tolerances, and TEDs are displayed for a three-dimensional model as three-dimensional annotations.

Figure 3:
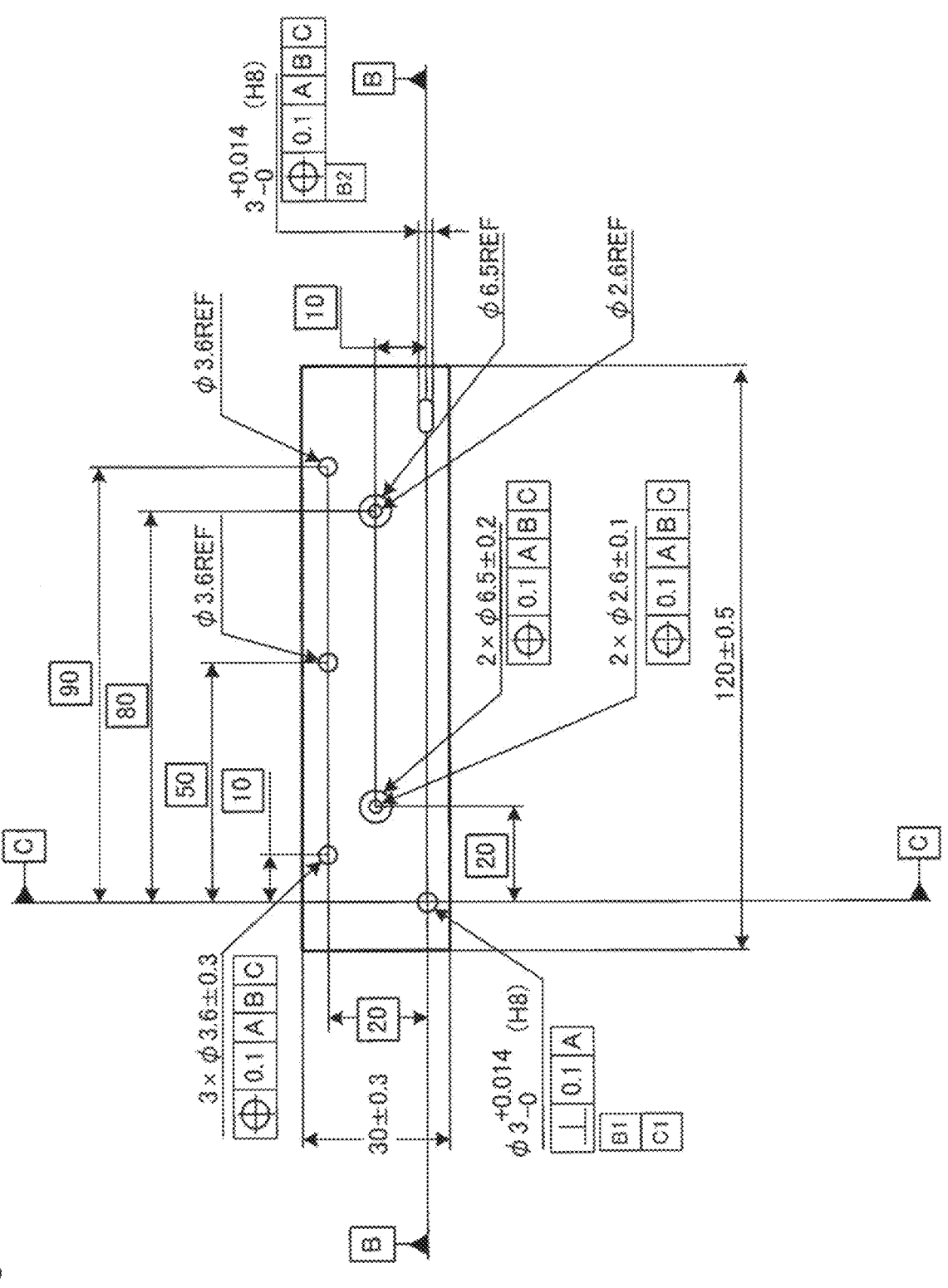
FIG. 3 is a diagram illustrating an example of two-dimensional drawing data including PMI.

FIG. 3 illustrates an example of two-dimensional drawing (abbreviated as "2D drawing") data including such PMI. The two-dimensional drawing data illustrated in FIG. 3 is obtained by converting the three-dimensional model illustrated in FIG. 2 into a printable two-dimensional drawing. The various pieces of PMI such as size tolerances, geometrical tolerances, and TEDs are also displayed for the two-dimensional drawing. Such two-dimensional drawing data can be printed on a sheet of paper. On manufacturing sites where apparatus such as personal computers are not available, therefore, three-dimensional models of parts and products are converted into two-dimensional drawings and printed on sheets of paper for use.

When a design is changed after a two-dimensional drawing is created, however, a difference is undesirably caused between three-dimensional drawing data and two-dimensional drawing data if the change is incorporated into the three-dimensional drawing data but the two-dimensional drawing data is left unchanged. When two-dimensional drawing data is corrected on a manufacturing site but the correction is not incorporated into three-dimensional drawing data, too, a difference is undesirably caused between the three-dimensional drawing data and the two-dimensional drawing data. If such a difference is not eliminated, mass-produced products might be undesirably manufactured without a change in design incorporated.

The drawing data management server 20 according to the present exemplary embodiment, therefore, detects a difference between three-dimensional drawing data and two-dimensional drawing data through a process that will be described hereinafter without requiring any effort by the user.

Figure 4:
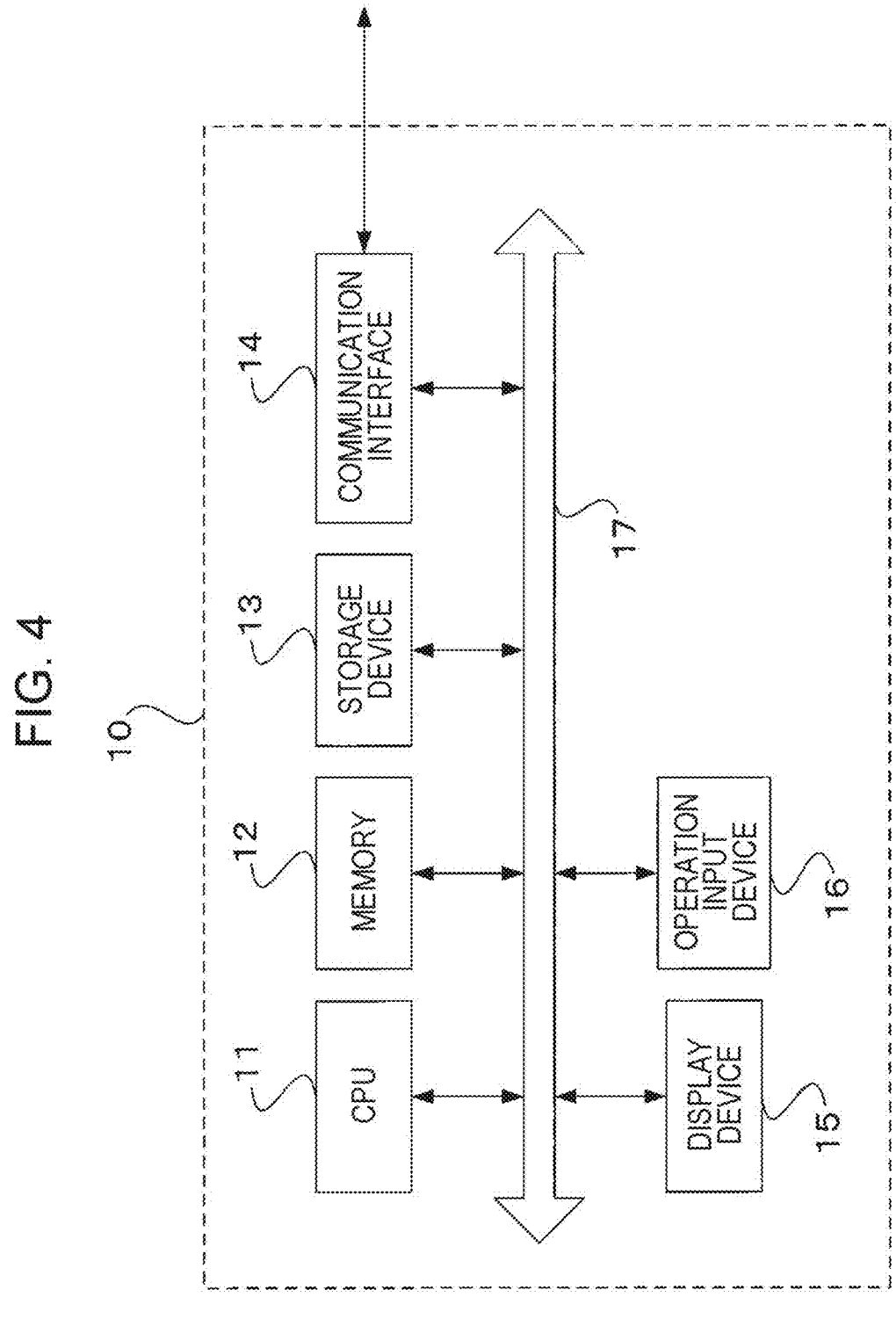
FIG. 4 is a block diagram illustrating the hardware configuration of a terminal apparatus according to the exemplary embodiment of the present disclosure.

Next, FIG. 4 illustrates the hardware configuration of the terminal apparatuses 10 in the drawing processing system according to the present exemplary embodiment.

As illustrated in FIG. 4, the terminal apparatuses 10 each include a central processing unit (CPU) 11, a memory 12, a storage device 13 such as a hard disk drive, a communication interface 14 that communicates data with external apparatuses over the network 30, a display device 15 such as a liquid crystal display, and an operation input device 16 including a touch panel or a keyboard. These components are connected to one another through a control but 17.

The CPU 11 is a processor that controls the operation of the terminal apparatus 10 by performing certain processing on the basis of a control program stored in the memory 12 or the storage device 13. Although the CPU 11 loads and executes the control program stored in the memory 12 or the storage device 13 in the present exemplary embodiment, the control program need not be stored in the memory 12 or the storage device 13. The control program may be stored in a computer readable medium and provided, instead. For example, the control program may be stored in an optical disc such as a compact disc read-only memory (CD-ROM) or a digital versatile disc read-only memory (DVD-ROM) or a semiconductor memory such as a universal serial bus (USB) memory or a memory card and provided, instead. Alternatively, the control program may be obtained from an external apparatus over a communication network connected to the communication interface 14.

Figure 5:
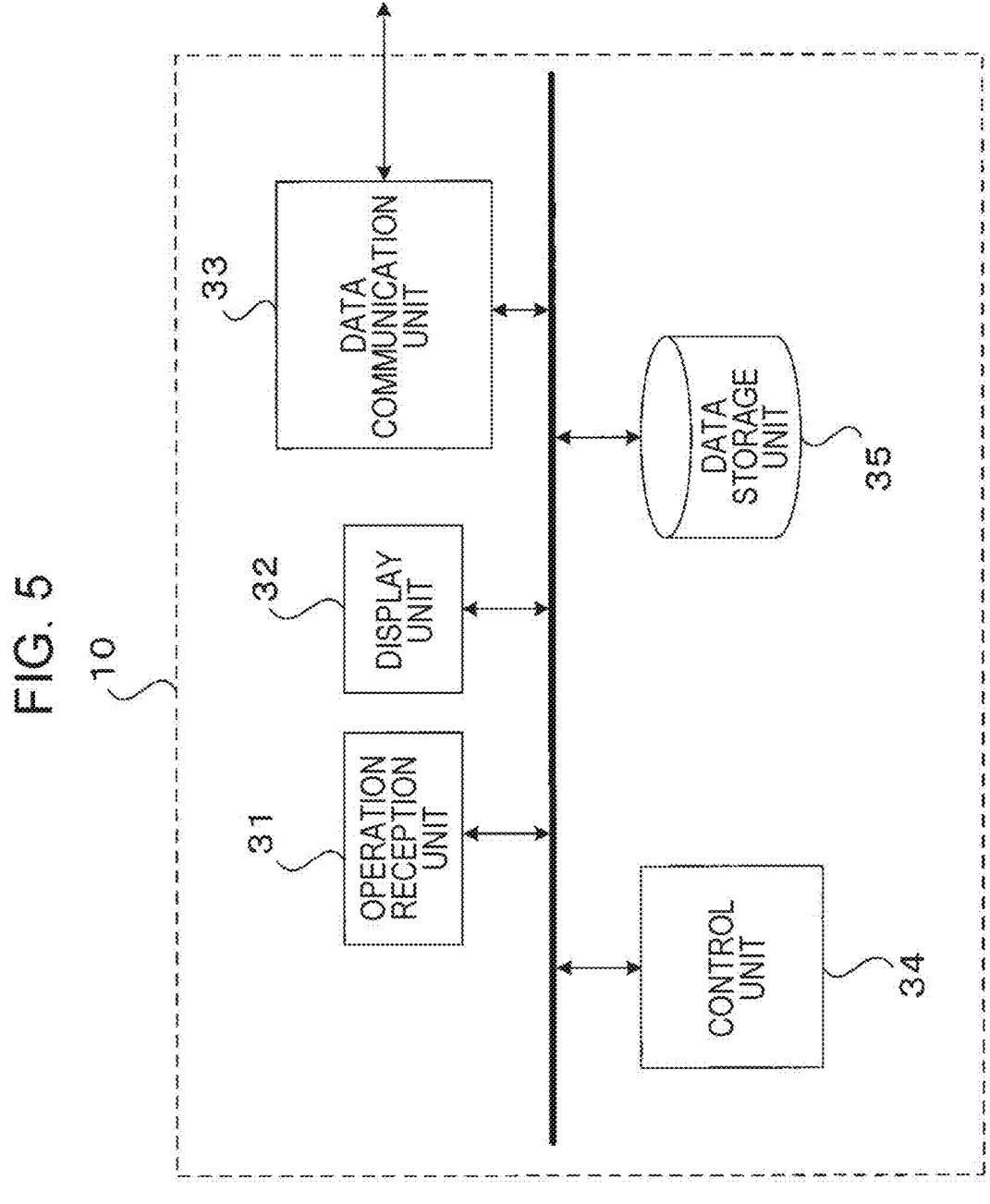
FIG. 5 is a block diagram illustrating the functional configuration of the terminal apparatus according to the exemplary embodiment of the present disclosure.

FIG. 5 is a block diagram illustrating the functional configuration of the terminal apparatuses 10 achieved by executing the control program.

As illustrated in FIG. 5, the terminal apparatuses 10 according to the present exemplary embodiment each include an operation reception unit 31, a display unit 32, a data communication unit 33, a control unit 34, and a data storage unit 35.

The data communication unit 33 communicates data with external apparatuses including the drawing data management server 20.

The display unit 32 is controlled by the control unit 34 and displays various pieces of information for a user. The operation reception unit 31 receives various operations performed by the user.

The control unit 34 receives drawing data from the drawing data management server 20 through the data communication unit 33, stores the drawing data in the data storage unit 35, and displays the drawing data stored in the data storage unit 35 on the display unit 32. The control unit 34 also changes the drawing data stored in the data storage unit 35 on the basis of a user operation received by the operation reception unit 31 and uploads the changed drawing data to the drawing data management server 20 through the data communication unit 33. The control unit 34 also has a function of converting three-dimensional drawing data stored in the second image 35 into a two-dimensional drawing.

Such drawing data is used in not only a design process but also various later processes including an estimation process, a drawing check process, a model design process, a jig design process, and an inspection process. The terminal apparatus 10, therefore, can convert three-dimensional drawing data into two-dimensional drawing data and print the two-dimensional drawing data on sheets of paper to use the two-dimensional drawing data at various places.

The control unit 34 determines relationships between plural pieces of PMI included in two-dimensional drawing data and generates first information indicating the relationships between the plural pieces of PMI on the basis of the determined relationships. The control unit 34 also determines relationships between plural pieces of PMI included in three-dimensional drawing data and generates second information indicating the relationships between the plural pieces of PMI on the basis of the determined relationships. The control unit 34 then detects differences between the first information and the second information by identifying correspondence between the first information and the second information.

For example, the control unit 34 determines that there is a relationship between first PMI and second PMI indicating a form indicated by the first PMI and generates information indicating that there is a parent-child relationship between the first PMI and the second PMI. If PMI indicated by the first information and PMI indicated by the second information match in units of parent-child relationships, the control unit 34 determines that there is correspondence.

In addition, if PMI is in one-to-one, one-to-many, many-to-one, or many-to-many correspondence between the first information and the second information, the control unit 34 determines that there is correspondence.

If there is a difference, between the first information and the second information, in the number of pieces of PMI included in the identified correspondence, the control unit 34 may identify relative positions of forms indicated by the PMI included in the two-dimensional drawing data or the three-dimensional drawing data, whichever the number of pieces of PMI in the identified correspondence is larger, and then identify one-to-one correspondences by comparing the relative positions with those of forms indicated by the PMI included in the other.

More specifically, when PMI is in one-to-many, many-to-one, or many-to-many correspondence between the first information and the second information, the control unit 34 brings the PMI indicated by the first information and the PMI indicated by the second information into one-to-one correspondence by converting coordinates of the two-dimensional drawing or the three-dimensional model such that reference coordinates, which are coordinates of PMI in one-to-one correspondence between the first information and the second information, relatively match between the two-dimensional drawing and the three-dimensional model.

Even when PMI does not match between the first information and the second information and is not in correspondence, the control unit 34 determines that there is correspondence between the first information and the second information if the PMI is in correspondence within a predetermined tolerance. More specifically, if pieces of PMI that have different descriptions due to notational differences have essentially the same meaning, the control unit 34 determines that the pieces of PMI match.

The control unit 34 determines that, as the first information or the second information, there is a relationship between a piece of PMI which defines a geometrical tolerance and a piece of PMI which defines a TED indicating a form indicated by the geometrical tolerance and generates information indicating a parent-child relationship where the piece of PMI which defines the geometrical tolerance is a parent and the piece of PMI which defines the TED is a child.

The control unit 34 also determines that, as the first information or the second information, there is correspondence between at least two pieces of PMI where defined geometrical tolerances or size tolerances indicate the same form and generates information indicating the at least two pieces of PMI are in correspondence.

The control unit 34 also determines that, as the first information or the second information, plural sets of PMI determined to be in correspondence belong to the same group, and generates information indicating that the plural sets of PMI belong to the same group. Here, sets of PMI belonging to the same group refer to plural pieces of PMI that define the same specification, such as the same size tolerance or the same geometrical tolerance, for different forms.

The control unit 34 also determines that, as the first information or the second information, there is a relationship between a piece of PMI which defines a geometrical tolerance or a piece of PMI which defines a size tolerance and a piece of PMI which defines supplementary information regarding the piece of PMI which defines the geometrical tolerance or the size tolerance and generates information indicating a parent-child relationship where the piece of PMI which defines the geometrical tolerance or the size tolerance is a parent and the piece of PMI which defines the supplementary information is a child.

The control unit 34 also determines that, as the first information or the second information, at least two pieces of PMI which define the same size tolerance or at least two pieces of PMI which define the same geometrical tolerance belong to the same group and generates information indicating that the at least two pieces of PMI belong to the same group.

The control unit 34 may display pieces of PMI detected to have a difference between the first information and the second information on a two-dimensional drawing or in a three-dimensional model in a display mode different from one for other pieces of PMI. More specifically, the control unit 34 may display pieces of PMI determined to be not in correspondence between a two-dimensional drawing and a three-dimensional model in a color or a shape different from one for other pieces of PMI or with a highlighting effect or a warning sign indicating that the pieces of PMI are not in correspondence. In such a display mode, the user can recognize parts that are not in correspondence between a two-dimensional drawing and a three-dimensional model when the two-dimensional drawing or the three-dimensional model is displayed.

Furthermore, the control unit 34 may correct PMI in two-dimensional drawing data or three-dimensional drawing data such that the difference detected between the first information and the second information is eliminated. In this case, the control unit 34 determines the two-dimensional drawing data or the three-dimensional drawing data as valid data and corrects the other data. When determining the three-dimensional drawing data as valid data, for example, the control unit 34 corrects PMI in the two-dimensional drawing data that is not in correspondence.

Next, operations performed by the terminal apparatuses 10 in the drawing data processing system according to the present exemplar embodiment will be described in detail with reference to the drawings.

Figure 6:
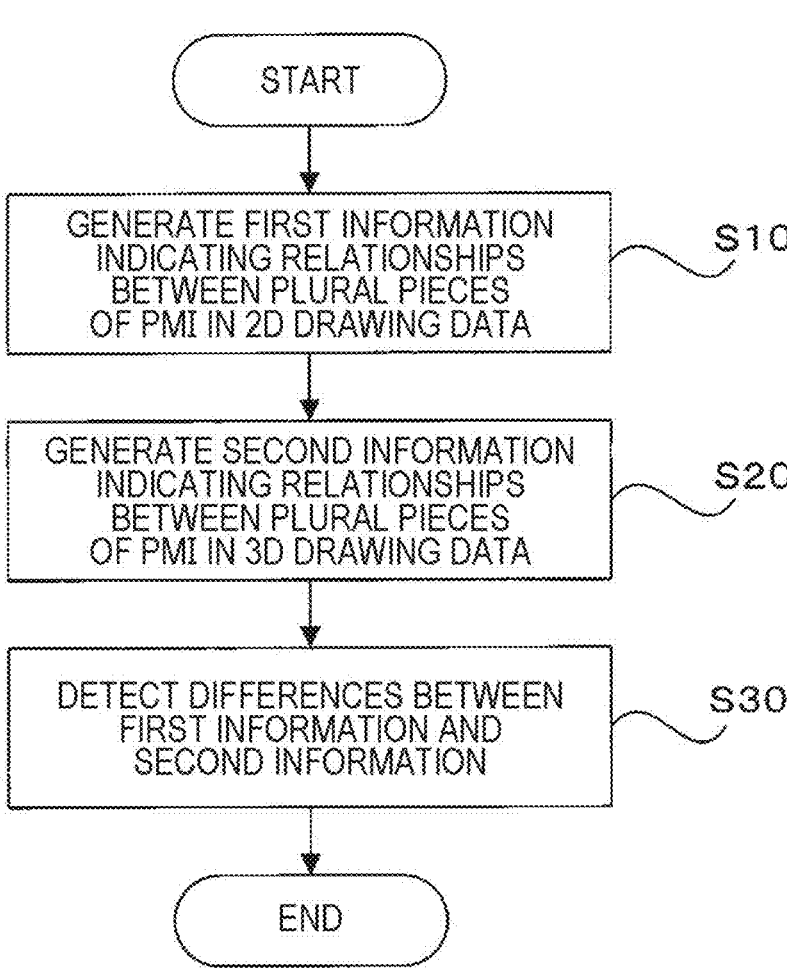
FIG. 6 is a flowchart illustrating an outline of operations performed by the terminal apparatus to detect a difference between two-dimensional drawing data and three-dimensional drawing data.

First, an outline of operations performed by each of the terminal apparatuses 10 to detect a difference between two-dimensional drawing data and three-dimensional drawing data will be described with reference to a flowchart of FIG. 6.

In step S10, the control unit 34 determines relationships between plural pieces of PMI included in two-dimensional drawing data and generates first information indicating the relationships between the plural pieces of PMI on the basis of the determined relationships.

In step S20, the control unit 34 determines relationships between plural pieces of PMI included in three-dimensional drawing data and generates second information indicating the relationships between the plural pieces of PMI on the basis of the determined relationships.

Lastly, in step S30, the control unit 34 detects differences between the first information and the second information.

Determining Relationships Between Plural Pieces of PMI

Figure 7:
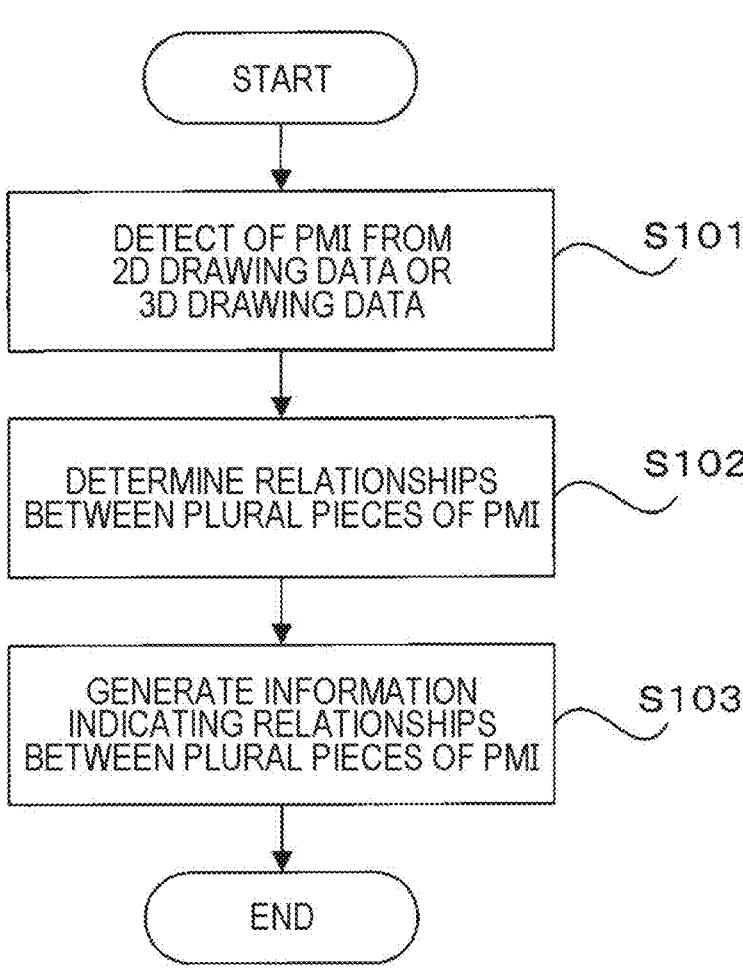
FIG. 7 is a flowchart illustrating an outline of operations performed by the terminal apparatus to generate information indicating a relationship between plural pieces of PMI on the basis of three-dimensional drawing data including PMI.

First, an outline of the operations performed by each of the terminal apparatuses 10 to generate information indicating relationships between plural pieces of PMI on the basis of three-dimensional drawing data or two-dimensional drawing data including PMI, which has been described as steps S10 and S20 in the flowchart of FIG. 6, will be described with reference to FIG. 7.

First, in step S101, the control unit 34 detects PMI included in drawing data stored in the second image 35, such as three-dimensional drawing data.

Next, in step S102, the control unit 34 determines relationships between plural pieces of PMI on the basis of the PMI.

In step S103, the control unit 34 generates information indicating the determined relationships between the plural pieces of PMI. The control unit 34 may add the generated information indicating the relationships between the plural pieces of PMI to each of the plural pieces of PMI determined to have the corresponding relationship or to the three-dimensional drawing data as separate information independent of the plural pieces of PMI determined to have the corresponding relationship. Alternatively, the control unit 34 may independently hold the generated information indicating the relationships between the plural pieces of PMI as information separate from the three-dimensional drawing data.

Next, a specific example of the process for detecting plural pieces of PMI described as step S101 of the flowchart of FIG. 7 will be described with reference to FIGS. 8 to 11.

In general, PMI is associated in three-dimensional drawing data with forms relating to three-dimensional shapes to indicate which parts nominal dimensions, which are also called "illustrated sizes", and tolerances correspond to. In three-dimensional drawing data illustrated in FIG. 8, for example, an elongated hole 50 is provided in a portion of a plate-like part, and PMI defines a TED 41, a size tolerance 42, and a geometrical tolerance 43.

Figure 9:
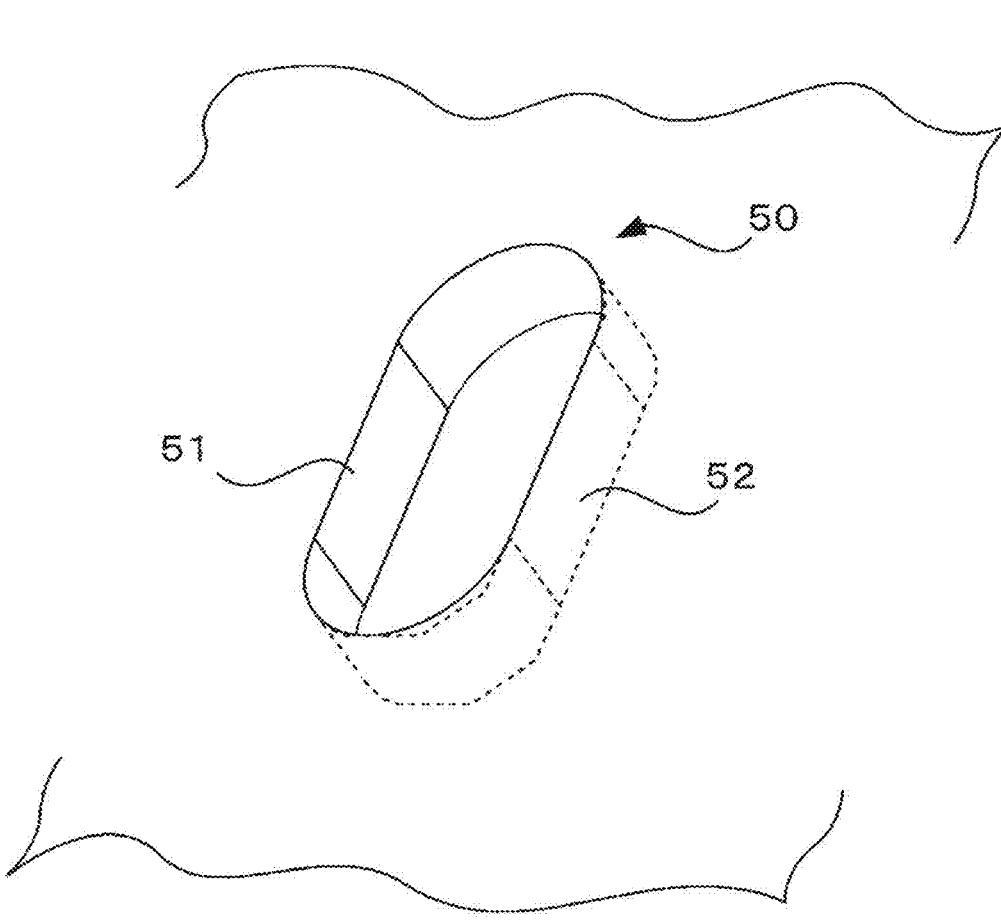
FIG. 9 is a perspective view of an elongated hole in the three-dimensional drawing data illustrated in FIG. 8.

FIG. 9 is a perspective view of the elongated hole 50. Here, two side surfaces of the elongated hole 50 will be referred to as "forms 51 and 52", respectively.

In this case, the TED 41 indicates a distance from a datum C to a central line between the forms 51 and 52. The size tolerance 42 indicates a distance between the forms 51 and 52. The geometrical tolerance 43 indicates a tolerance of the TED 41, that is, the distance from the datum C to the central line between the forms 51 and 52.

Figure 10:
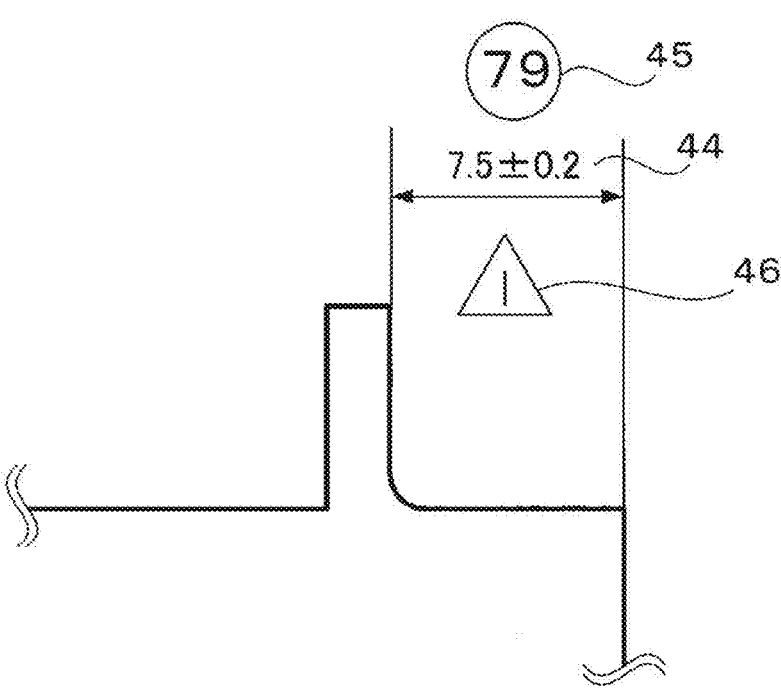
FIG. 10 is a diagram illustrating another example of the three-dimensional drawing data.

In three-dimensional drawing data, a piece of PMI might accompany another piece of PMI as supplementary information. In FIG. 10, for example, a size tolerance 44, a balloon symbol 45, and a caliper instruction 46 have the following accompanying relationship. The balloon symbol 45 indicates that the size tolerance 44 is a 79th inspection item. The caliper instruction 46 indicates a method used to measure the size tolerance 44. A caliper instruction herein refers to an instruction about a measurement method indicating, for example, that when a distance between two surfaces is measured, it is only required that the distance be measured at one position.

Figure 8:
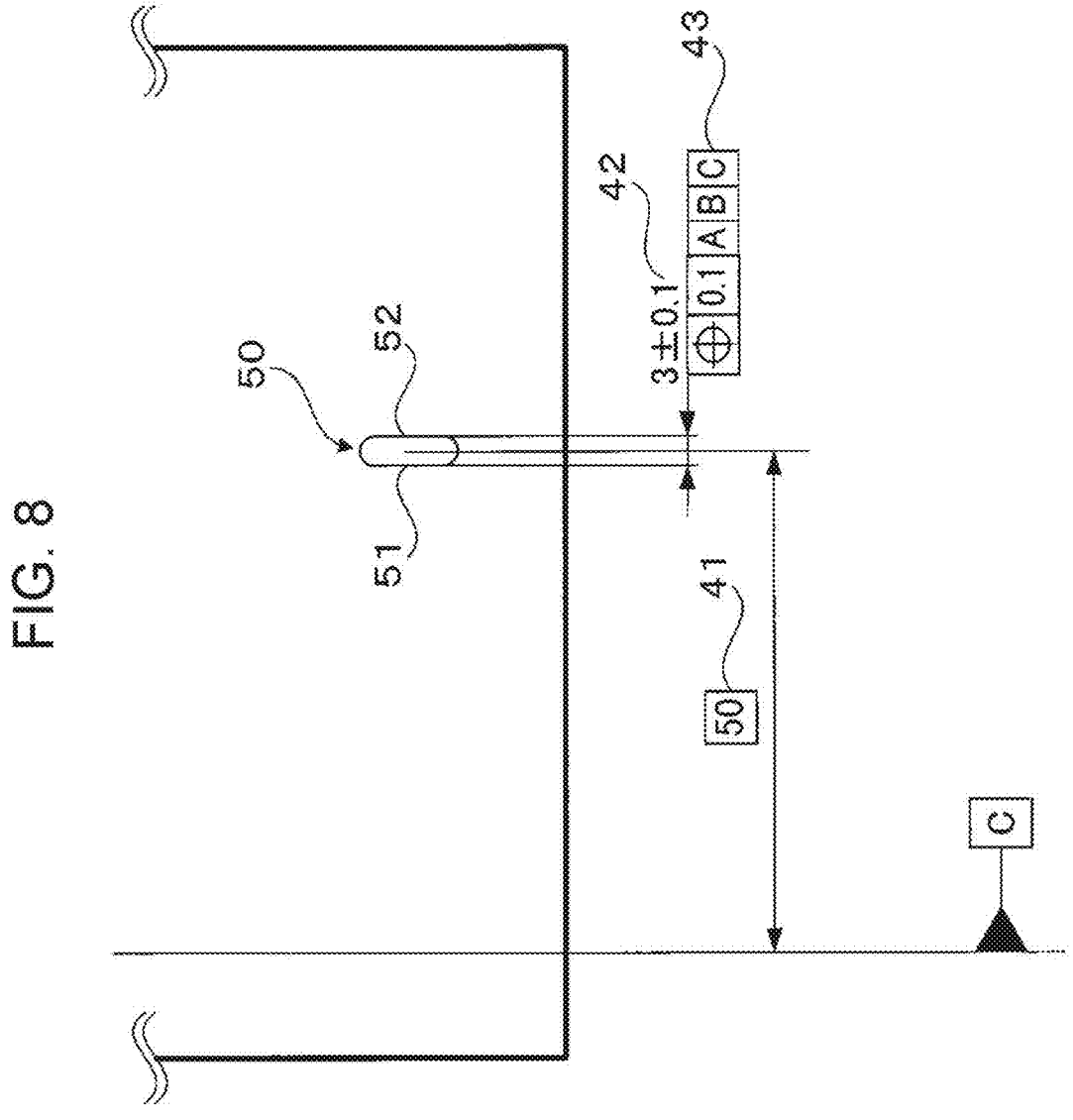
FIG. 8 is a diagram illustrating an example of three-dimensional drawing data.

FIG. 11 illustrates an example of PMI detected from the three-dimensional drawing data illustrated in FIGS. 8 and 10. Association between pieces of PMI and forms can be extracted from three-dimensional data using a software development kit (SDK) or the like. The example of PMI illustrated in FIG. 11 includes only part of available information in order to simplify the description, and other pieces of information can also be obtained in practice.

In practice, each of pieces of PMI is given an identification number with which the piece of PMI is identified, but in FIG. 11, the reference numeral given to each of the pieces of PMI is used for identification instead of an identification number, in order to simplify the description.

As illustrated in FIG. 11, each of the pieces of PMI obtained from the three-dimensional drawing data includes an identification number, a type, a value, information indicating whether the piece of PMI is a TED, and information indicating related forms.

Next, the control unit 34 determines relationships between plural pieces of PMI on the basis of PMI detected from the three-dimensional drawing data. An example of types of relationship and conditions will be described in the following (1) to (3).

(1) Parent-Child Relationship where Size Tolerance is Parent and Geometrical Tolerance is Child If related forms of a piece of PMI whose type is a size tolerance and related forms of a piece of PMI whose type is a geometrical tolerance at least partly match, the control unit 34 determines that the size tolerance and the geometrical tolerance have a parent-child relationship.

Figure 12:
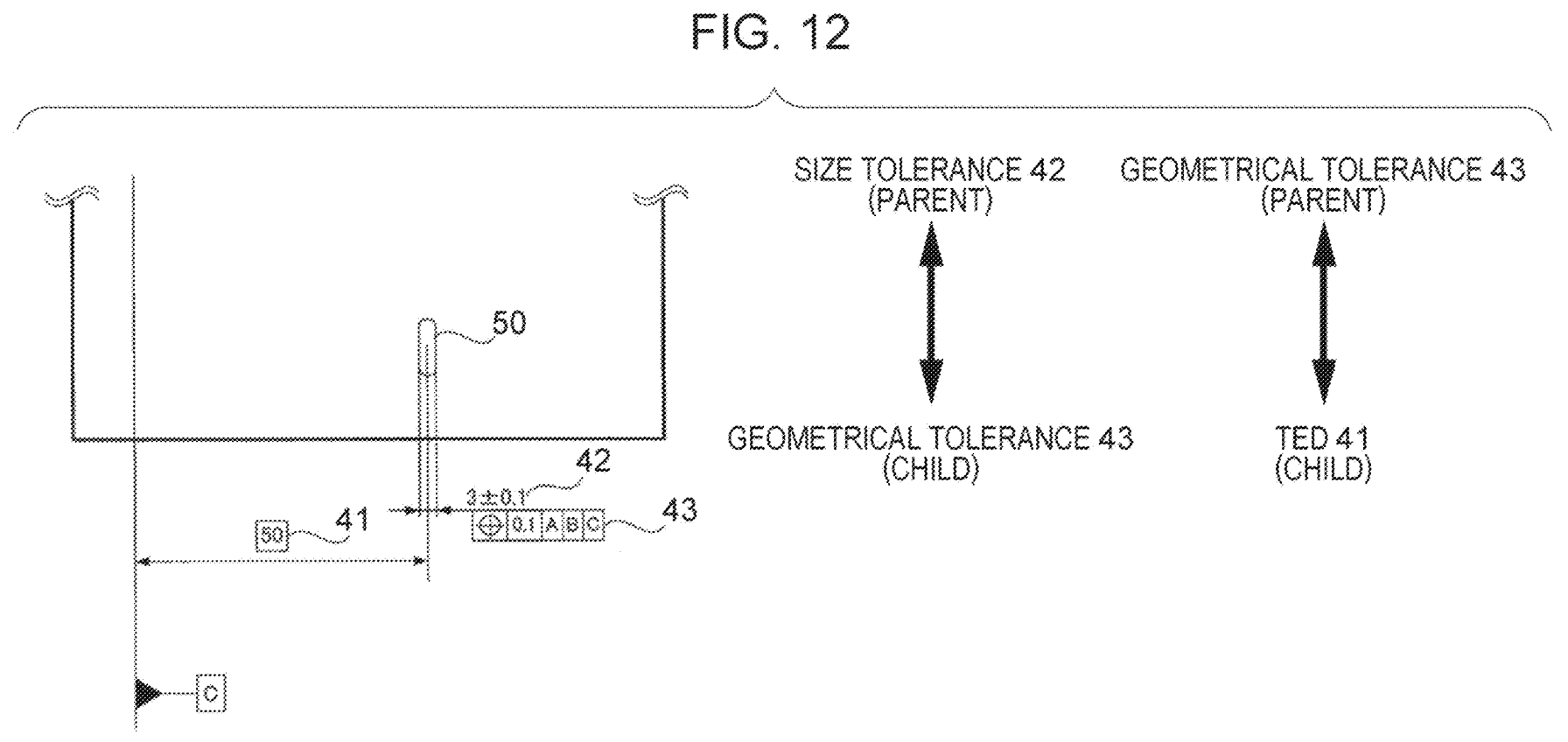

More specifically, in the example illustrated in FIG. 8, the control unit 34 determines, as illustrated in FIG. 12, that there is a parent-child relationship where the size tolerance 42 is a parent and the geometrical tolerance 43 is a child.

(2) Parent-Child Relationship where Geometrical Tolerance is Parent and TED is Child If related forms of a piece of PMI whose type is a geometrical tolerance and related forms of a piece of PMI whose type is a TED at least partly match, the control unit 34 determines that the geometrical tolerance and the TED have a parent-child relationship. More specifically, in the example illustrated in FIG. 8, the control unit 34 determines, as illustrated in FIG. 12, that there is a parent-child relationship where the geometrical tolerance 43 is a parent and the TED 41 is a child.

(3) Parent-Child Relationship where Size Tolerance or Geometrical Tolerance is Parent and Piece of PMI that Defines Supplementary Information Regarding Parent PMI is Child If there is a piece of PMI accompanying another piece of PMI whose type is a size tolerance or a geometrical tolerance, the control unit 34 determines that the size tolerance or the geometrical tolerance and the accompanying piece of PMI have a parent-child relationship.

Figure 13:
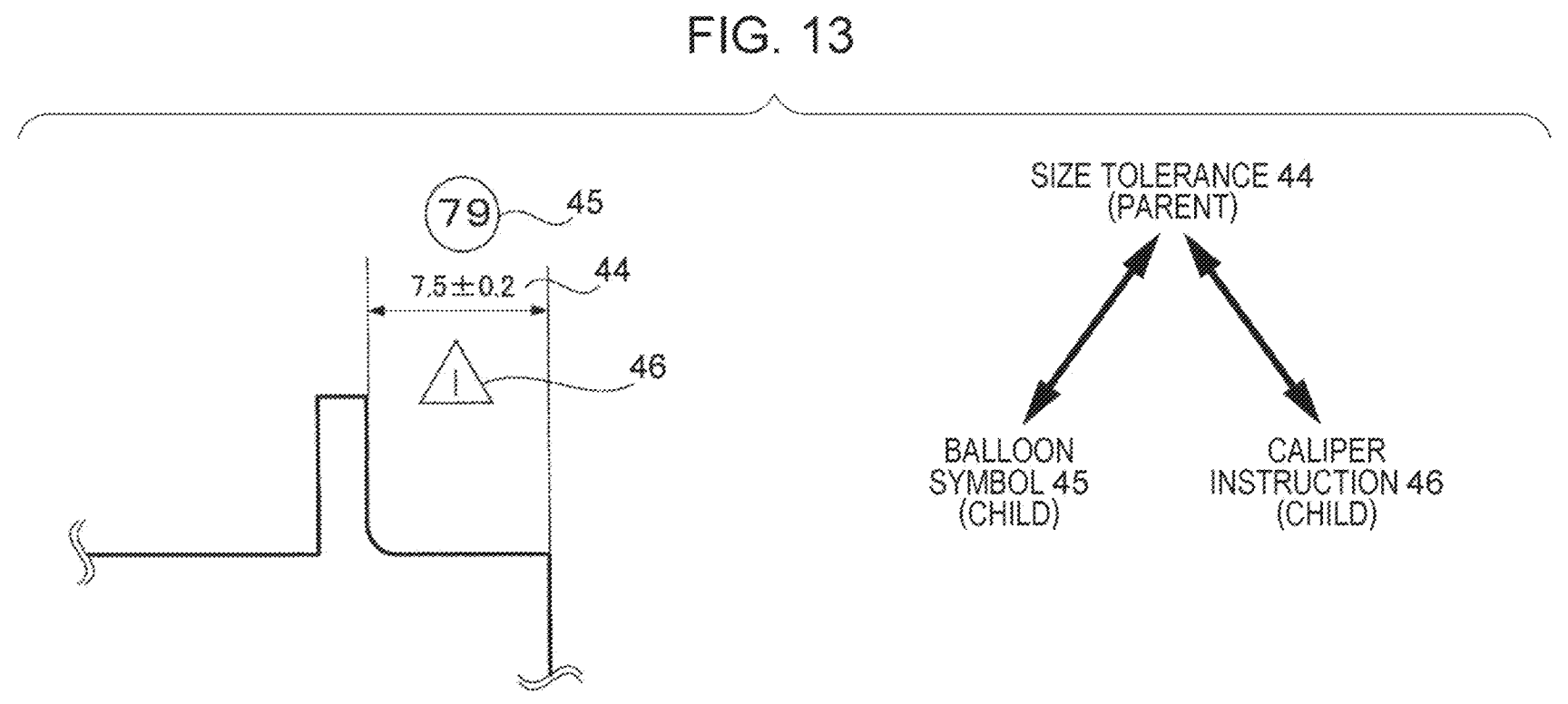

More specifically, in the example illustrated in FIG. 10, the control unit 34 determines, as illustrated in FIG. 13, that there is a parent-child relationship where the size tolerance 44 is a parent and the balloon symbol 45 and the caliper instruction 46 are children. Such a parent-child relationship can be determined because a size tolerance or a geometrical tolerance and supplementary information regarding the size tolerance or the geometrical tolerance are displayed together as three-dimensional annotations.

The control unit 34 generates information indicating relationships between plural pieces of PMI on the basis of results of determinations, which are achieved by the above method, as to the relationships between the plural pieces of PMI. FIG. 14 illustrates an example of information indicating relationships between plural pieces of PMI generated in this manner. FIG. 14 illustrates an example of information indicating relationships determined in FIGS. 12 and 13.

In FIG. 14, an identification number of parent PMI and/or an identification number of child PMI are given to each of the pieces of PMI. For example, parent PMI of the TED 41 is the geometrical tolerance 43, and child PMI of the size tolerance 42 is the geometrical tolerance 43. Similarly, parent PMI of the geometrical tolerance 43 is the size tolerance 42, and child PMI of the geometrical tolerance 43 is the TED 41.

In FIG. 14, child PMI of the size tolerance 44 is the balloon symbol 45 and the caliper instruction 46, and parent PMI of the balloon symbol 45 and the caliper instruction 46 is the size tolerance 44.

That is, the information illustrated in FIG. 14 indicates the parent-child relationships between the pieces of PMI illustrated in FIGS. 12 and 13. When two pieces of PMI have a parent-child relationship, information indicating the parent-child relationship is given to both the pieces of PMI in FIG. 14. The information indicating the parent-child relationship, however, may be given to only one of the pieces of PMI, instead.

When information indicating parent-child relationships between pieces of PMI is added to three-dimensional drawing data and held, too, the information may be held separately from the pieces of PMI. Alternatively, information indicating parent-child relationships between pieces of PMI may be managed separately from three-dimensional drawing data as a definition file indicating the parent-child relationships between the pieces of PMI.

Although PMI is detected from three-dimensional drawing data and relationships between plural pieces of PMI are determined in the above description, PMI may be detected from general-purpose two-dimensional drawing data such as DXF data and relationships between plural pieces of PMI may be determined, instead.

Figure 15:
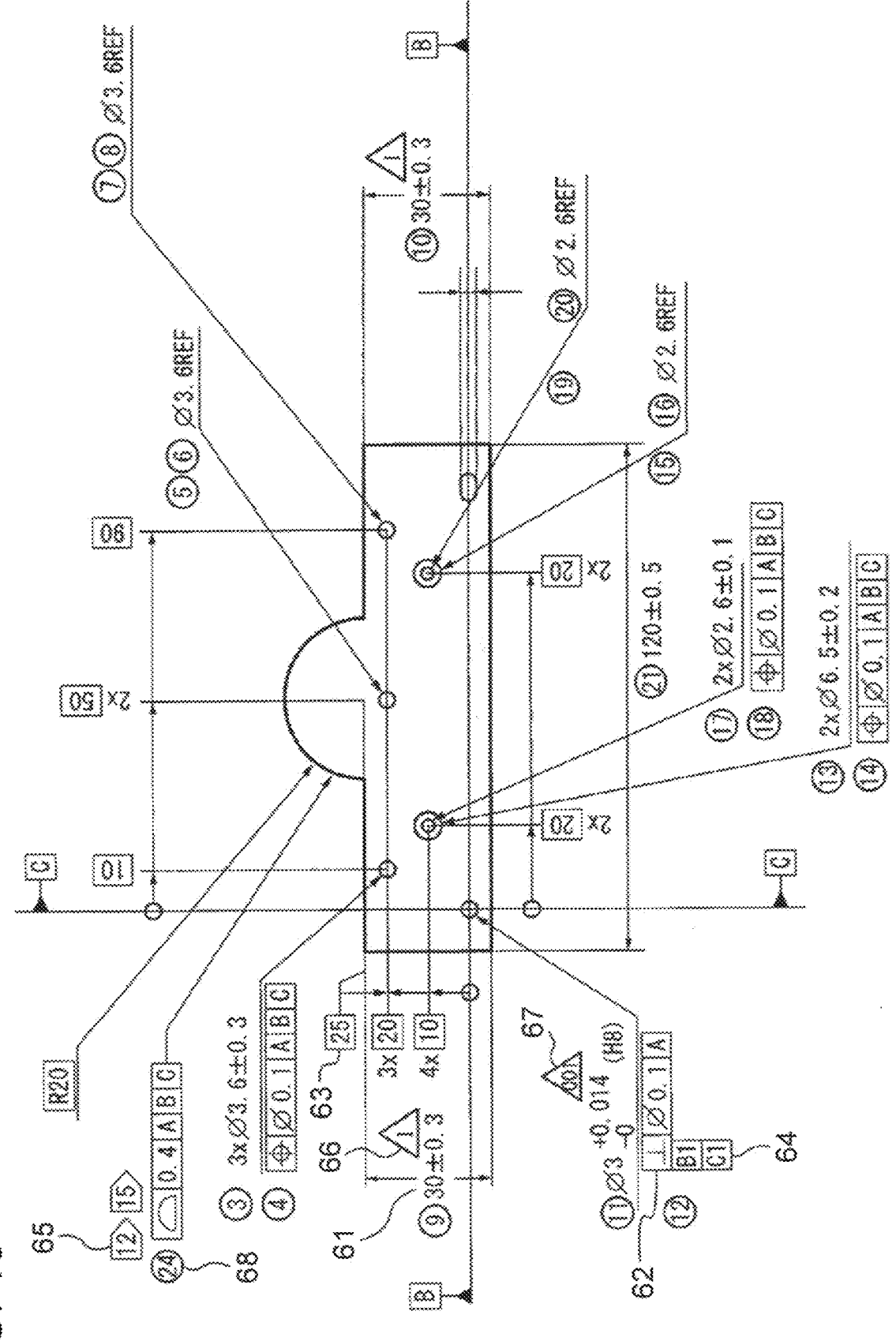
FIG. 15 is a diagram illustrating an example of a two-dimensional drawing based on drawing exchange format (DXF) data.

FIG. 15 illustrates an example of a two-dimensional drawing based on such DXF data.

The two-dimensional drawing illustrated in FIG. 15 includes pieces of PMI that define a size tolerance 61, a geometrical tolerance 62, a TED 63, a datum target 64, a note flag 65, a caliper instruction 66, a design change symbol 67, and a balloon symbol 68, respectively. FIG. 16 illustrates a list of types of the pieces of PMI included in the DXF data regarding the two-dimensional drawing illustrated in FIG. 15.

In FIG. 16, a TED and a size tolerance specify dimensions such as length, angle, or diameter and entity types thereof in DXF data are "dimension". Here, an entity refers to each of symbols, such as a geometrical tolerance and a size tolerance, expressed by the pieces of PMI in DXF data.

In FIG. 16, types of pieces of PMI, meanings, features, and entity types of the geometrical tolerance 62, the TED 63, the datum target 64, the note flag 65, the caliper instruction 66, the design change symbol 67, and the balloon symbol 68 are also specified.

Figure 17:
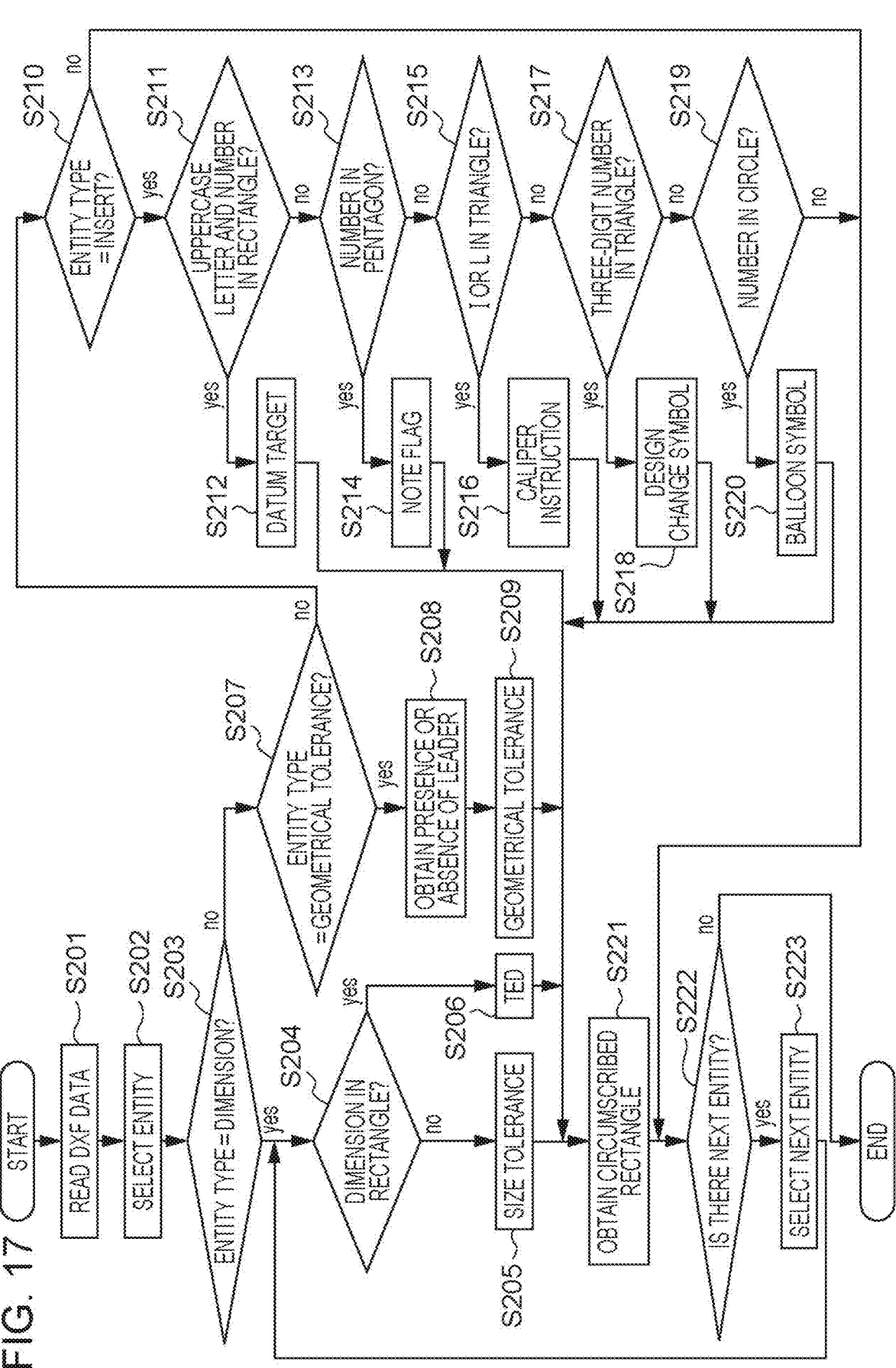
FIG. 17 is a flowchart illustrating a method for detecting PMI from DXF data.

Next, a method for detecting such PMI from DXF data will be described with reference to a flowchart of FIG. 17.

First, the control unit 34 reads DXF data stored in the data storage unit 35 in step S201 and selects an entity in step S202.

Next, in step S203, the control unit 34 determines whether an entity type of the selected entity is "dimension". If determining in step S203 that the entity type of the selected entity is "dimension", the control unit 34 determines, in step S204, whether a symbol for the entity is a dimension in a rectangle.

If determining in step S204 that the symbol for the entity is not a dimension in a rectangle, the control unit 34 determines, in step S205, that a piece of PMI expressed by the selected entity is a size tolerance. If determining in step S204 that the symbol for the entity is a dimension in a rectangle, the control unit 34 determines, in step S206, that the piece of PMI expressed by the selected entity is a TED.

If determining in step S203 that the entity type of the selected entity is not "dimension", the control unit 34 determines, in step S207, whether the entity type of the selected entity is "geometrical tolerance".

If determining in step S207 that the entity type of the selected entity is "geometrical tolerance", the control unit 34 obtains, in step S208, information indicating presence or absence of a leader for the entity and determines, in step S209, that the piece of PMI expressed by the selected entity is a geometrical tolerance.

If determining in step S207 that the entity type of the selected entity is not "geometrical tolerance", the control unit 34 determines, in step S210, whether the entity type of the selected entity is "insertion".

If determining in step S210 that the entity type of the selected entity is "insertion", the control unit 34 determines, in step S211, whether the symbol for the entity is an uppercase letter and a number, which together indicate a datum, in a rectangle.

If determining in step S211 that the symbol for the entity is an uppercase letter and a number in a rectangle, the control unit 34 determines, in step S212, that the piece of PMI expressed by the selected entity is a datum target.

If determining in step S211 that the symbol for the entity is not an uppercase letter and a number in a rectangle, the control unit 34 determines, in step S213, whether the symbol for the entity is a number in a pentagon.

If determining in step S213 that the symbol for the entity is a number in a pentagon, the control unit 34 determines, in step S214, determines that the piece of PMI expressed by the selected entity is a note flag.

If determining in step S213 that the symbol for the entity is not a number in a pentagon, the control unit 34 determines, in step S215, whether the symbol for the entity is "I" or "L" in a triangle.

If determining in step S215 that the symbol for the entity is "I" or "L" in a triangle, the control unit 34 determines, in step S216, that the piece of PMI expressed by the selected entity is a caliper instruction.

If determining in step S215 that the symbol for the entity is not "I" or "L" in a triangle, the control unit 34 determines, in step S217, whether the symbol for the entity is a three-digit number in a triangle.

If determining in step S217 that the symbol for the entity is a three-digit number in a triangle, the control unit 34 determines, in step S218, that the piece of PMI expressed by the selected entity is a design change symbol.

If determining in step S217 that the symbol for the entity is not a three-digit number in a triangle, the control unit 34 determines, in step S219, whether the symbol for the entity is a number in a circle.

If determining in step S219 that the symbol for the entity is a number in a circle, the control unit 34 determines, in step S220, that the piece of PMI expressed by the selected entity is a balloon symbol.

After identifying a type of PMI expressed by the selected entity in step S205, S206, S209, S212, S214, S216, S218, or S220, the control unit 34 obtains, in step S221, information regarding a circumscribed rectangle of the piece of PMI whose type has been identified.

The control unit 34 then determines, in step S222, whether there is a next entity in the DXF data. If determining in step S219 that the symbol for the entity is not a number in a circle or determining in step S210 that the entity type of the selected entity is not "insertion", too, the control unit 34 determines, in step S222, whether there is a next entity in the DXF data.

If determining in step S222 that there is a next entity in the DXF data, the control unit 34 selects the next entity in step S223 and returns to step S204. If determining in step S222 that there is no next entity in the DXF data, the control unit 34 ends the process.

Figure 18:
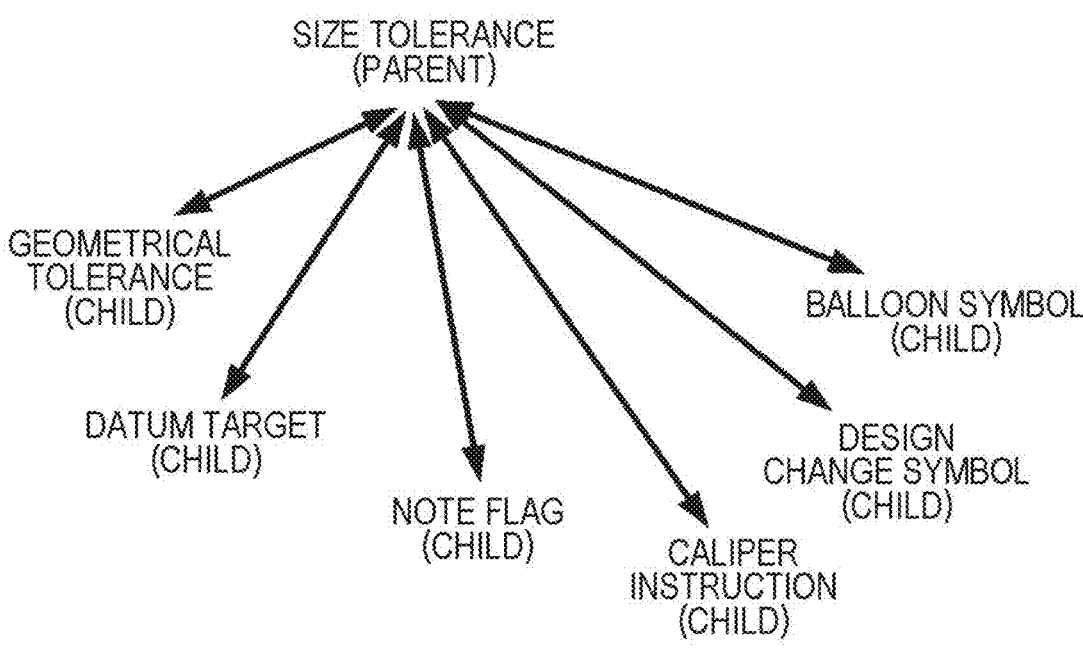
FIG. 18 is a diagram illustrating a specific example where relationships between plural pieces of PMI are determined on the basis of PMI detected from DXF data.

Next, the control unit 34 determines relationships between plural pieces of PMI on the basis of PMI detected from DXF data. FIGS. 18 to 19B illustrate specific examples of types of relationship.

As illustrated in FIG. 18, for example, the control unit 34 determines, as pattern 1, that there are parent-child relationships where a piece of PMI whose type is a size tolerance is a parent and pieces of PMI whose types are a geometrical tolerance, a datum target, a note flag, a caliper instruction, a design change symbol, and a balloon symbol, respectively, are children.

Figure 19A:
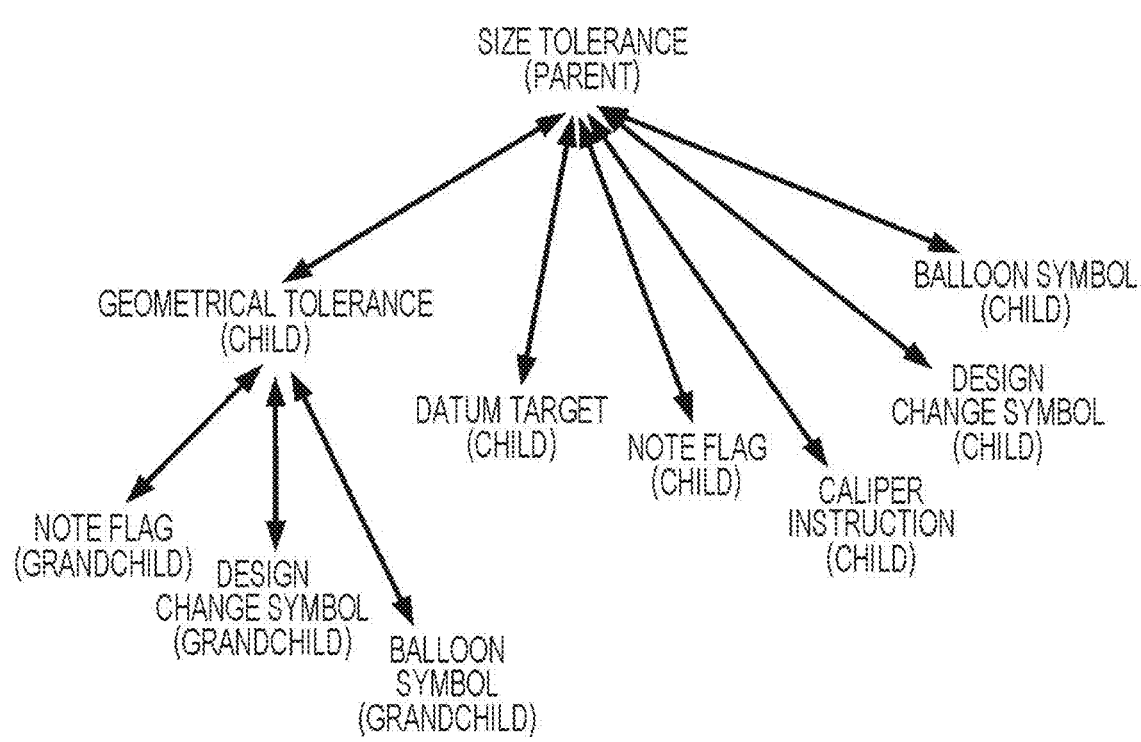
FIGS. 19A and 19B are diagrams illustrating specific examples where relationships between plural pieces of PMI are determined on the basis of PMI detected from DXF data.
Figure 19B:
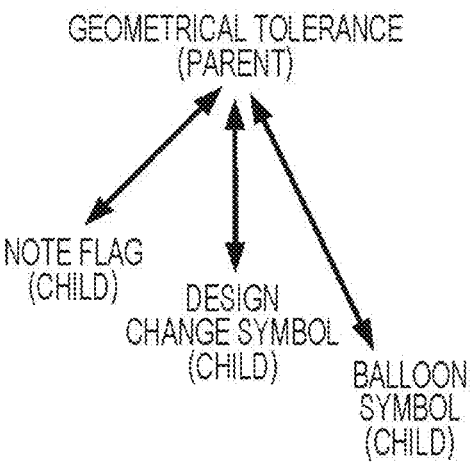

Alternatively, as illustrated in FIG. 19A, for example, the control unit 34 determines, as pattern 2, that there are parent-child relationships where a piece of PMI whose type is a size tolerance is a parent, pieces of PMI whose types are a geometrical tolerance, a datum target, a note flag, a caliper instruction, a design change symbol, and a balloon symbol, respectively, are children, and pieces of PMI whose types are a note flag, a design change symbol, and a balloon symbol, respectively, are grandchildren. In FIG. 19A, the note flag, the design change symbol, and the balloon symbol that are grandchildren of the size tolerance are children of the geometrical tolerance.

Alternatively, as illustrated in FIG. 19B, the control unit 34 may determine, as pattern 3, that there are only parent-child relationships where the piece of PMI whose type is a geometrical tolerance is a parent and the pieces of PMI whose types are a note flag, a design change symbol, and a balloon symbol, respectively, are children.

Figure 20:
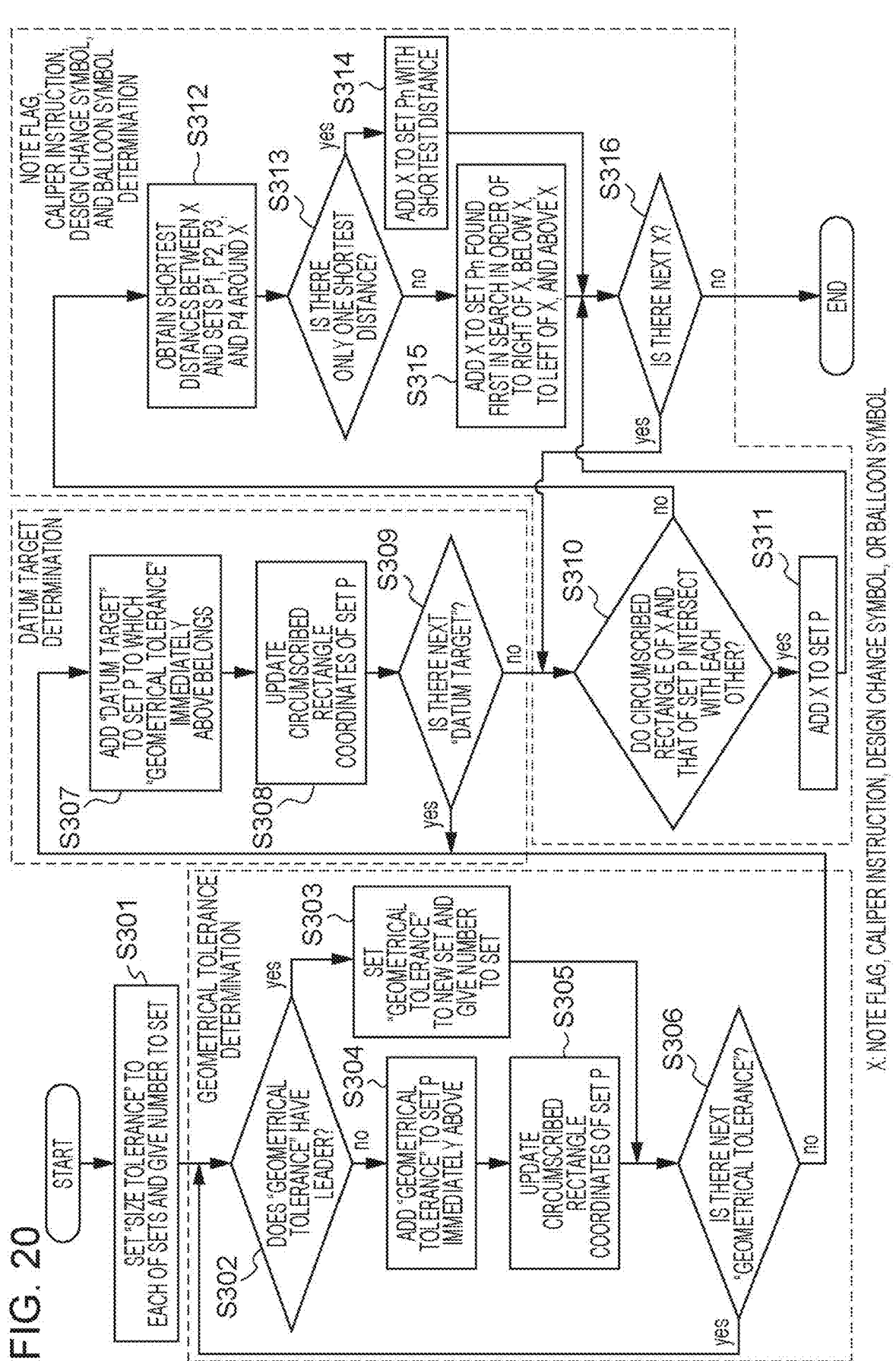
FIG. 20 is a flowchart illustrating a method for determining relationships such as those illustrated in FIGS. 18 to 19B.

Next, an example of a method for determining relationships such as those illustrated in FIGS. 18 to 19B will be described with reference to a flowchart of FIG. 20.

First, in step S301, the control unit 34 sets a piece of PMI whose type is a size tolerance in each of sets and gives a number to the set. Here, a set refers to plural pieces of PMI having the parent-child relationships in one of the patterns illustrated in FIGS. 18 to 19B.

Next, the control unit 34 makes a determination as to a geometrical tolerance through steps S302 to S306. More specifically, in step S302, the control unit 34 selects, in DXF data, one of pieces of PMI whose types are a geometrical tolerance and determines whether the piece of PMI whose type is a geometrical tolerance has a leader. If determining in step S302 that the piece of PMI whose type is a geometrical tolerance has a leader, the control unit 34 sets, in step S303, the piece of PMI whose type is a geometrical tolerance to a new set and gives a number to the new set.

If determining in step S302 that the piece of PMI whose type is a geometrical tolerance does not have a leader, the control unit 34 adds, in step S304, the piece of PMI whose type is a geometrical tolerance to a set P immediately above. "Immediately above" refers to a position right above in the DXF data. In step S305, the control unit 34 updates circumscribed rectangle coordinates of the set P to which the piece of PMI whose type is a geometrical tolerance has been added.

In step S306, the control unit 34 determines whether there is a next piece of PMI whose type is a geometrical tolerance in the DXF data. The control unit 34 repeats steps S302 to S305 until there is no longer a piece of PMI whose type is a geometrical tolerance and that has not been subjected to the determination.

Next, the control unit 34 makes a determination as to a datum target through steps S307 to S309. More specifically, the control unit 34 selects, in step S307, one of pieces of PMI whose types are a datum target in the DXF data and adds the selected piece of PMI whose type is a datum target to a set P to which a piece of PMI whose type is a geometrical tolerance belongs, the piece of PMI whose type is a geometrical tolerance being located immediately above the piece of PMI whose type is a datum target. In step S308, the control unit 34 updates circumscribed rectangle coordinates of the set P to which the piece of PMI whose type is a datum target has been added.

In step S309, the control unit 34 determines whether there is a next piece of PMI whose type is a datum target in the DXF data. The control unit 34 repeats steps S307 and S308 until there is no longer a piece of PMI whose type is a datum target and that has not been subjected to the determination.

Next, the control unit 34 makes determinations as to a note flag, a caliper instruction, a design change symbol, and a balloon symbol through step S310 to S316. In the flowchart of FIG. 20, a piece of PMI whose type is a note flag, a caliper instruction, a design change symbol, or a balloon symbol is denoted by "X".

In step S310, the control unit 34 selects, in the DXF data, one of pieces of PMI whose type is a note flag, a caliper instruction, a design change symbol, or a balloon symbol and determines whether a circumscribed rectangle of the piece of PMI and the circumscribed rectangle of the set P intersect with each other. If determining in step S310 that the circumscribed rectangle of the piece of PMI whose type is a note flag, a caliper instruction, a design change symbol, or a balloon symbol and the circumscribed rectangle of the set P intersect with each other, the control unit 34 adds, in step S311, the piece of PMI to the set P.

If determining in step S310 that the circumscribed rectangle of the piece of PMI whose type is a note flag, a caliper instruction, a design change symbol, or a balloon symbol and the circumscribed rectangle of the set P do not intersect with each other, the control unit 34 obtains, in step S312, shortest distances between the piece of PMI whose type is a note flag, a caliper instruction, a design change symbol, or a balloon symbol and sets P1, P2, P3, and P4 located around the piece of PMI.

In step S313, the control unit 34 determines whether only one shortest distance has been obtained. If determining in step S313 that only one shortest distance has been obtained, the control unit 34 adds, in step S314, the piece of PMI to a set Pn with the shortest distance.

If determining in step S313 that two or more shortest distances have been obtained, the control unit 34 adds, in step S315, the piece of PMI to a set Pn found first in a search made in order of to the right of, below, to the left of, and above the piece of PMI.

After adding the piece of PMI whose type is a note flag, a caliper instruction, a design change symbol, or a balloon symbol to the set Pn in step S311, S314, or S315, the control unit 34 determines, in step S316, whether there is a next piece of PMI whose type is a note flag, a caliper instruction, a design change symbol, or a balloon symbol in the DXF data. The control unit 34 repeats steps S310 to S315 until there is no longer a piece of PMI whose type is a note flag, a caliper instruction, a design change symbol, or a balloon symbol and that has not been subjected to the determination.

As a result of the above process, the pieces of PMI included in the DXF data are set as a set of plural pieces of PMI in one of the patterns illustrated in FIGS. 18 to 19B.

Although parent-child relationships between plural pieces of PMI are determined and information indicating the parent-child relationships is generated in the above description, the control unit 34 also determines relationships where plural pieces of PMI belong to the same group and relationships where plural pieces of PMI belong to the same set and generates information indicating these relationships.

For example, the control unit 34 determines that at least two pieces of PMI where defined geometrical tolerances or size tolerances indicate forms of the same type are in correspondence and belong to the same group, and generates information indicating that the at least two pieces of PMI belong to the same group. More specifically, pieces of PMI that define specifications of plural holes, plural protrusions, or the like having the same shape and the same specifications are determined to belong to the same group.

In addition, the control unit 34 determines that at least two pieces of PMI where defined geometrical tolerances or size tolerances indicate the same form are in correspondence and belong to the same set, and generates information indicating that the at least two pieces of PMI belong to the same set. More specifically, pieces of PMI that define specifications of the same form, such as an inner diameter and an outer diameter of a form having the same central axis or height and width of a form, are determined to belong to the same set.

Detection of Differences between 2D Drawing Data and 3D Model Data

Next, a specific example of a method for detecting differences between two-dimensional drawing data and three-dimensional drawing data using information regarding relationships between plural pieces of PMI in the two-dimensional drawing data and information regarding relationship between plural pieces of PMI in the three-dimensional drawing data determined by the above-described method will be described.

Figure 21:
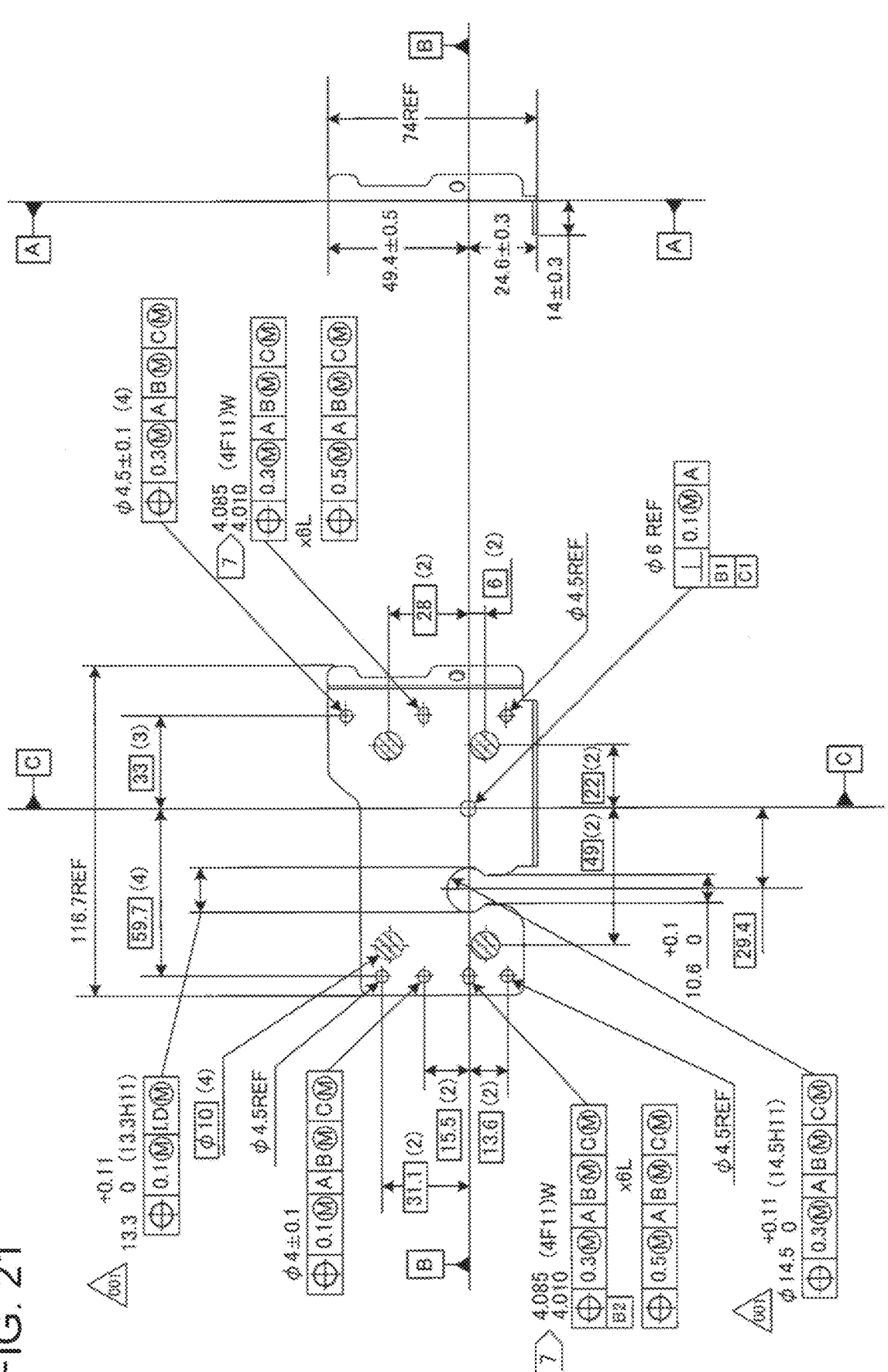
FIG. 21 is a diagram illustrating an example of two-dimensional drawing data regarding a part.
Figure 22:
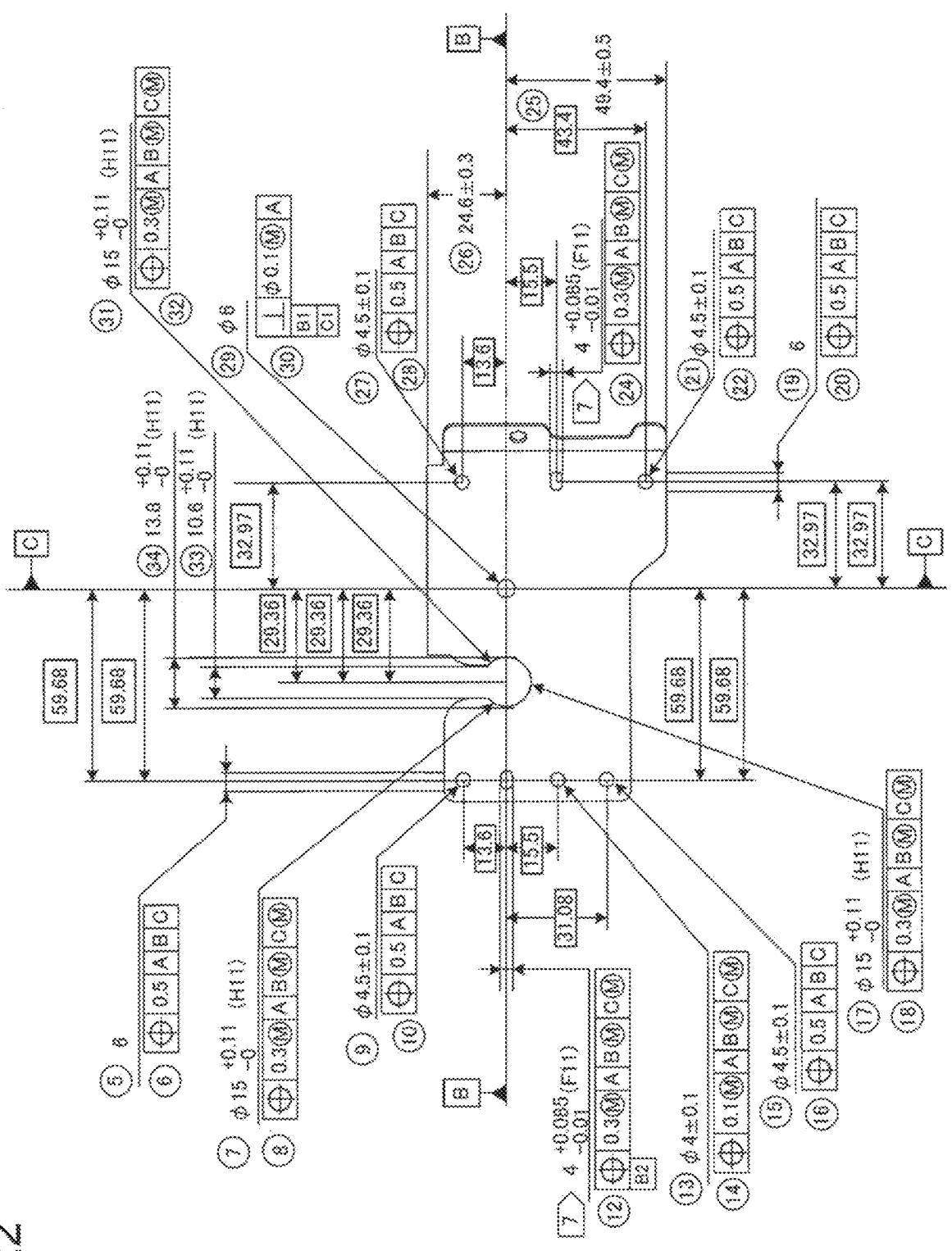
FIG. 22 is a diagram illustrating an example of three-dimensional drawing data regarding the certain part.

FIG. 21 illustrates an example of two-dimensional drawing data regarding a part. FIG. 22 illustrates an example of three-dimensional drawing data regarding the part. An operation for detecting differences between the two-dimensional drawing data illustrated in FIG. 21 and the three-dimensional drawing data illustrated in FIG. 22 will be specifically described.

First, the control unit 34 extracts pieces of PMI from the two-dimensional drawing data illustrated in FIG. 21, determines relationships between the extracted pieces of PMI, creates a set of PMI having a parent-child relationship, and sets the same parent-child relationship identifier (ID). If there are plural sets of PMI having the same parent-child relationship, the control unit 34 creates a set of PMI having a group relationship and sets the same group ID. Similarly, the control unit 34 extracts pieces of PMI from the three-dimensional drawing data illustrated in FIG. 22, determines relationships between the extracted pieces of PMI, creates sets of PMI having parent-child relationships, and groups the same parent-child relationship sets.

FIG. 23 illustrates an example of parent-child relationship sets grouped in this manner.

It can be seen in FIG. 23 that plural pieces of PMI determined to have a parent-child relationship are given the same parent-child relationship ID. Among the pieces of PMI extracted from the two-dimensional drawing data, for example, three pieces of PMI having PMI IDs of "3D3", "465", and "455", respectively, have been determined to have a parent-child relationship and given the same parent-child relationship ID of "P2-11". Similarly, three pieces of PMI having PMI IDs of "3FE", "468", and "3C8", respectively, have been determined to have a parent-child relationship and given the same parent-child relationship ID of "P2-28".

The same parent-child relationship sets are also determined to belong to the same group. In the case of the three pieces of PMI having the parent-child relationship ID of "P2-11" and the three pieces of PMI having the parent-child relationship ID of "P2-28", for example, the structure of the parent child relationships is the same, that is, a parent is a size tolerance and one of children is a geometrical tolerance and another child is a flag, and PMI types, tolerance types, nominal values, upper tolerance limit values, and lower tolerance limit values of the size tolerance and the geometrical tolerance and flag values of the flag are the same. The two parent-child relationship sets of "P2-11" and "P2-28", therefore, are determined to belong to the same group and given the same group ID of "G2-1". The determination as to parent-child relationship sets and the grouping of parent-child relationship sets are also performed for the pieces of PMI extracted from the three-dimensional drawing data.

The control unit 34 then refers to the pieces of PMI that have been extracted from the two-dimensional drawing data and whose relationships have been determined and the pieces of PMI that have been extracted from the three-dimensional drawing data and whose relationships have been determined and determines whether there are differences between one of parent-child relationship sets in each group and a corresponding parent-child relationship set through comparison. PMI types to be compared are a size tolerance, a geometrical tolerance, and a flag, and the control unit 34 ignores other PMI types included in the parent-child relationships.

More specifically, when the two-dimensional drawing data includes a parent-child relationship where a parent is a size tolerance and children are a geometrical tolerance and a balloon symbol and the three-dimensional drawing data includes a parent-child relationship where a parent is a size tolerance and a child is a geometrical tolerance, the parent-child relationships match since the balloon symbol in the two-dimensional drawing data is not a comparison target.

Figure 24:
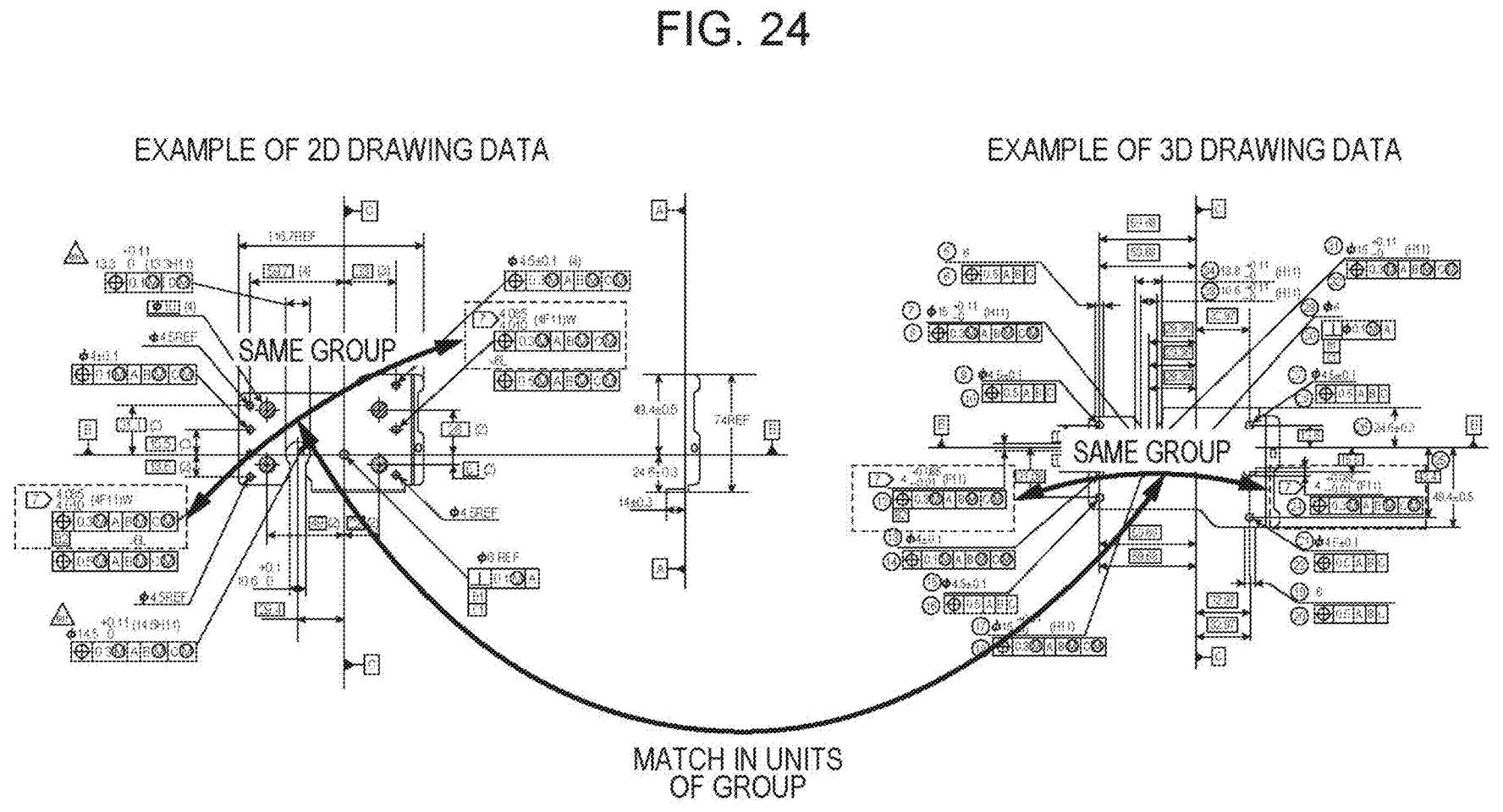

In the case of the data illustrated in FIG. 23, for example, the group of parent-child relationship sets having the group ID of "G2-1" and a group of parent-child relationship sets having a group ID of "G3-3" are determined to match as a result of the comparison. That is, as illustrated in FIG. 24, the two parent-child relationship sets determined to belong to the same group on a 2D drawing and two parent-child relationship sets determined to belong to the same group in a 3D model are determined to match in units of groups. A case illustrated in FIG. 24 is an example of a case where parent-child relationship sets are in two-to-two correspondence between a 2D drawing and a 3D model.

Figure 25:
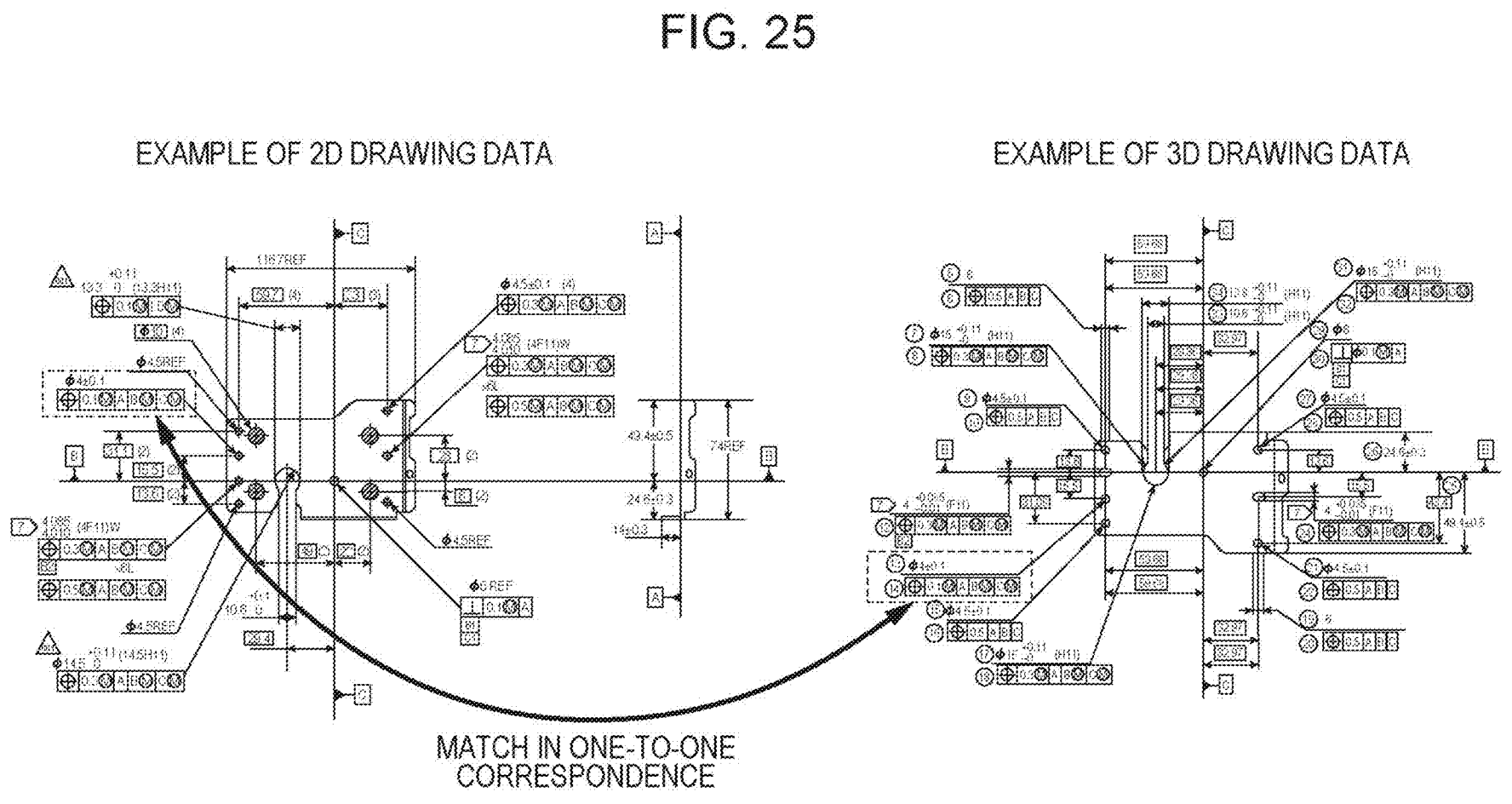

Similarly, FIG. 25 illustrates an example of a case where parent-child relationship sets of PMI are in one-to-one correspondence between a 2D drawing and a 3D model. In FIG. 25, one parent-child relationship set on the 2D drawing and one parent-child relationship set in the 3D model correspond to each other.

Figure 26:
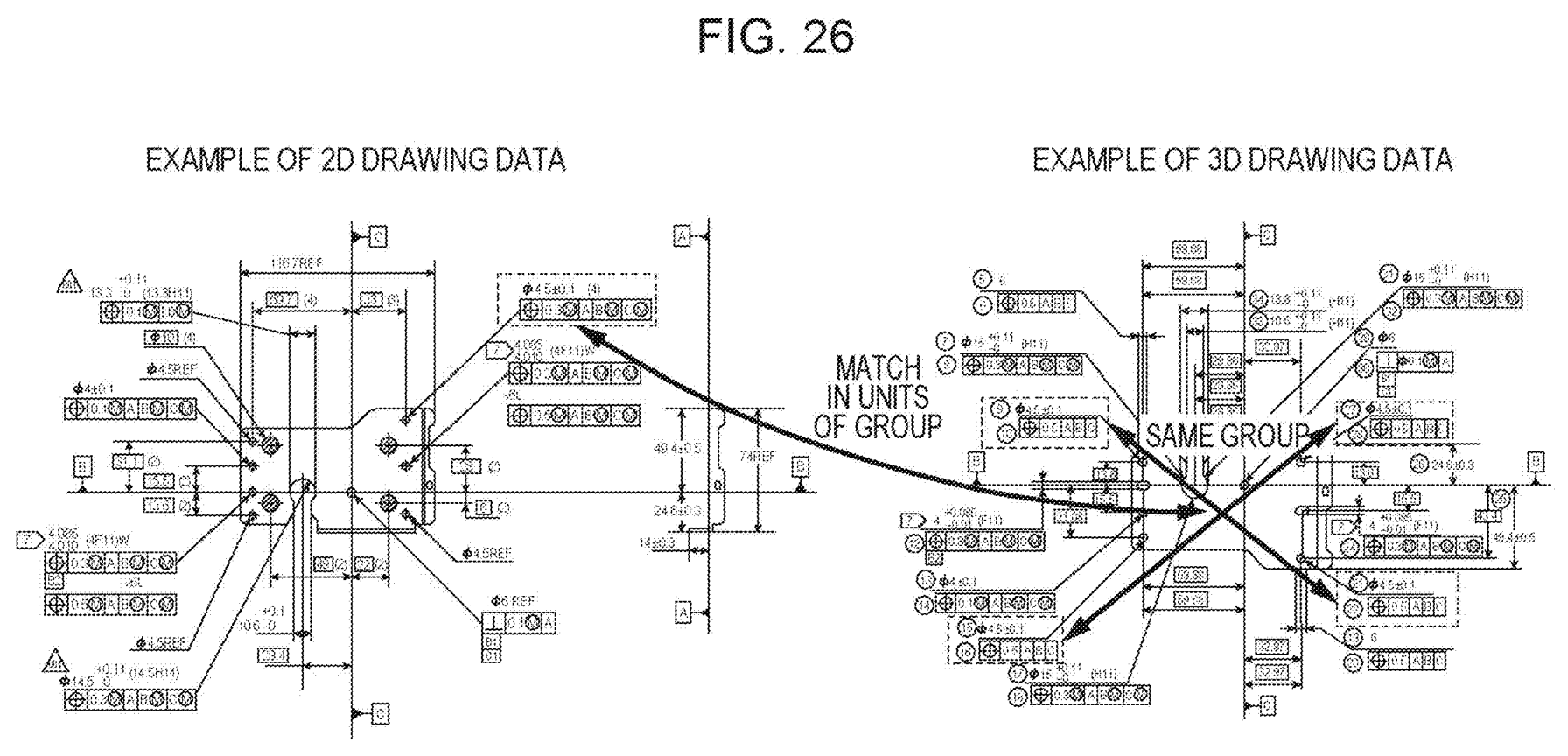

FIG. 26 illustrates an example of a case where parent-child relationship sets of PMI are in one-to-many correspondence, namely one-to-four correspondence, between a 2D drawing and a 3D model. In FIG. 26, one parent-child relationship set on the 2D drawing and four parent-child relationship sets in the 3D model correspond to each other. Here, a nominal value and a tolerance "Ø4.5±0.1 (4)" on the 2D drawing indicates that there are a total of four sets of a nominal value and a tolerance "Ø4.5±0.1" on the drawing. Although FIG. 26 illustrates a case where parent-child relationship sets are in one-to-many correspondence between a 2D drawing and a 3D model, parent-child relationship sets of PMI can be in many-to-one correspondence, instead.

A piece of PMI such as an outer diameter of a part is often provided for different views between a 2D drawing and a 3D model in consideration of visibility. Especially in a 3D model, various views of one part can be displayed. In the present exemplary embodiment, however, whether pieces of PMI provided for different views match can also be determined by determining grouped parent-child relationship sets of PMI in units of parent-child relationships.

Figure 27:
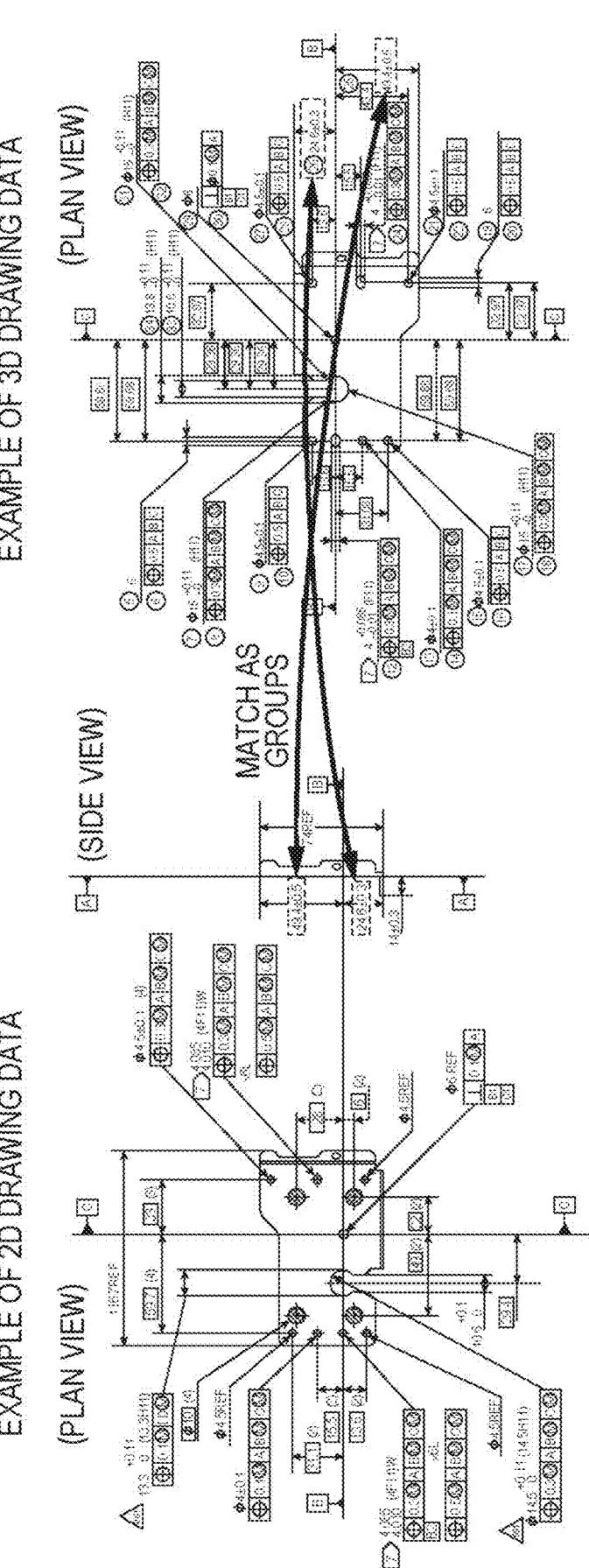
FIG. 27 is a diagram illustrating a case where parent-child relationship sets of PMI match between a side view on a 2D drawing and a plan view in a 3D model.
Figure 28:
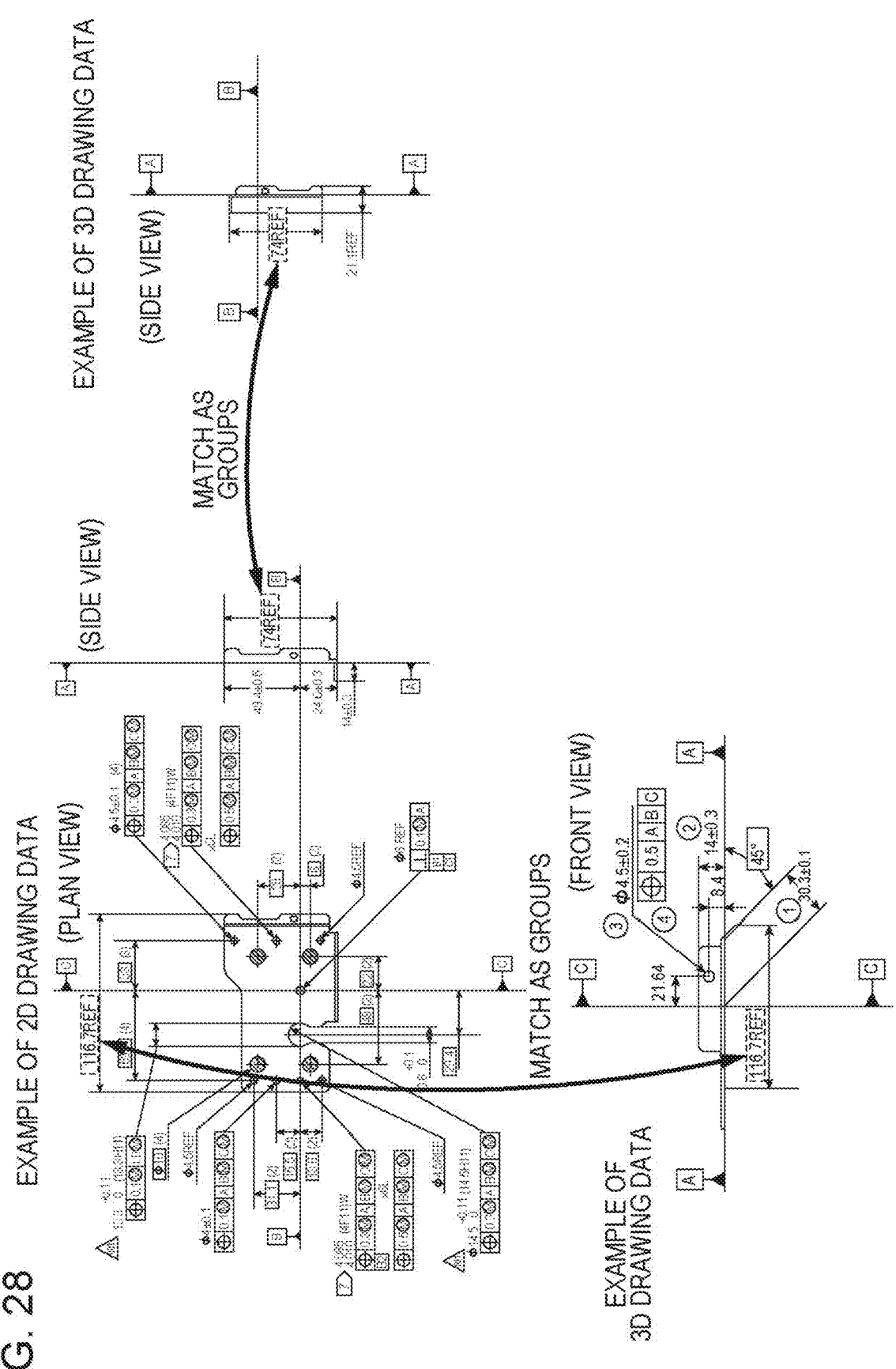
FIG. 28 is a diagram illustrating a case where parent-child relationship sets of PMI match between a side view on a 2D drawing and a side view in a 3D model and between a plan view on the 2D drawing and a plan view in the 3D model.

FIG. 27, for example, illustrates a case where parent-child relationship sets of PMI match between a side view on a 2D drawing and a plan view in a 3D model. FIG. 28, for example, illustrates a case where parent-child relationship sets of PMI match between a side view on a 2D drawing and a side view in a 3D model and between a plan view on the 2D drawing and a front view in the 3D model.

If one of pieces of PMI determined to be in one-to-many, many-to-one, or many-to-many correspondence between a 2D drawing and a 3D model as described above is changed on the 2D drawing or in the 3D model, it is difficult to identify a corresponding piece of PMI in the other of the 2D drawing or the 3D model. When parent-child relationship sets of PMI are in one-to-many, many-to-one, or many-to-many correspondence between a 2D drawing and a 3D model, therefore, the control unit 34 identifies relative positions of forms indicated by PMI on the 2D drawing or in the 3D model, whichever the number of pieces of PMI in the correspondence is larger, and compares the relative positions with those of forms indicated by corresponding pieces of PMI to identify one-to-one correspondences.

A process performed by the control unit 34 at this time will be described with reference to FIGS. 29 to 37.

First, the control unit 34 extracts, as reference coordinates, coordinates indicated by, among parent-child relationship sets in one-to-one correspondence between a 2D drawing and a 3D model, parent-child relationship sets of PMI belonging to views having the same datum axis.

Figure 29:
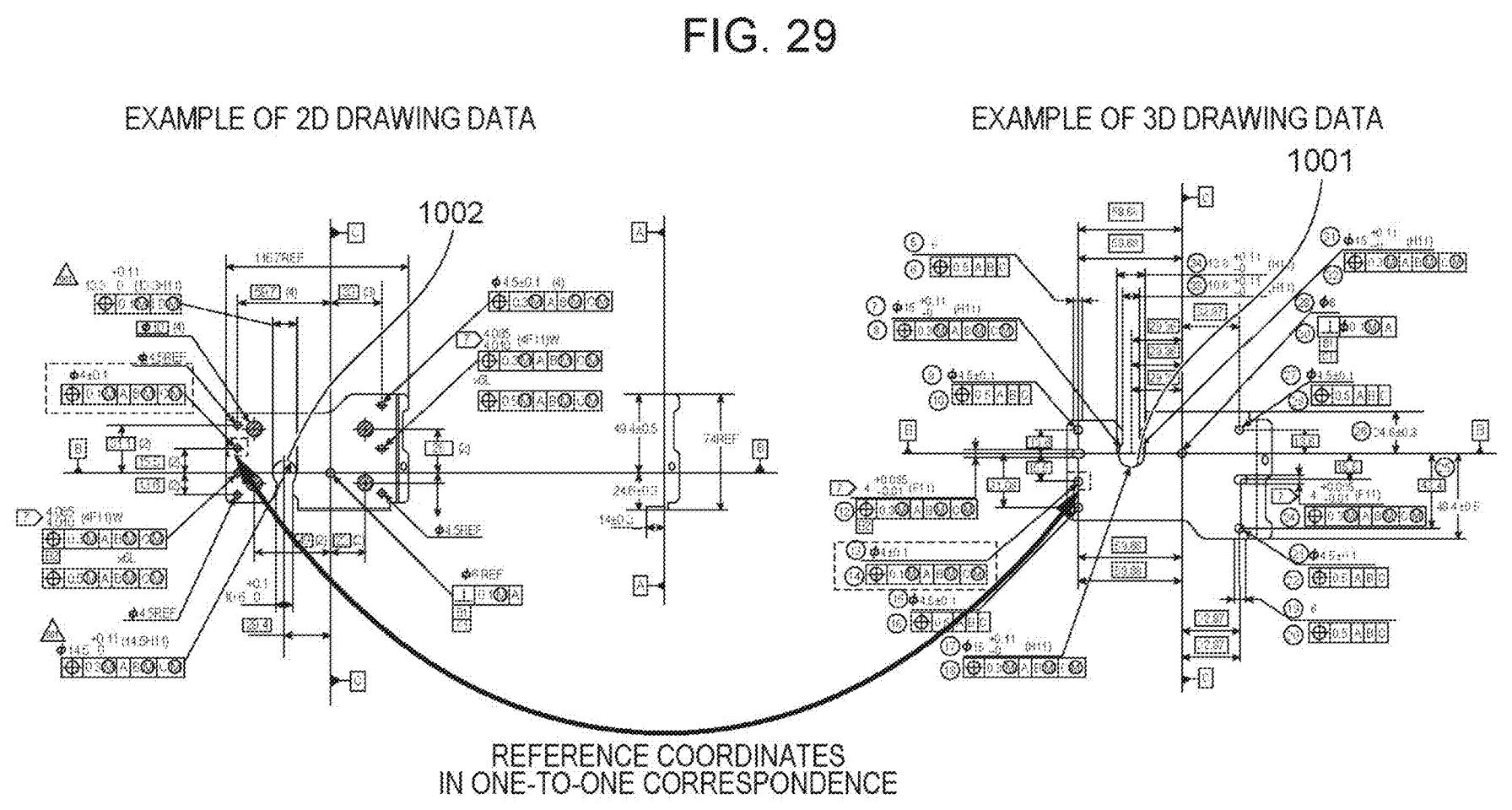

As illustrated in FIG. 29, for example, the control unit 34 extracts, as reference coordinates, center coordinates of each of holes indicated by parent-child relationship sets of PMI in one-to-one correspondence between the 2D drawing and the 3D model from a view including a B-axis and a C-axis as datums. The control unit 34 may extract a feature point in the view as reference coordinates, instead. The feature point may be one generally used in imaging processing or form processing, such as a bend in a form or an edge intersection. Recesses 1001 and 1002 in FIG. 29, for example, may be used as reference coordinates.

Figure 30:
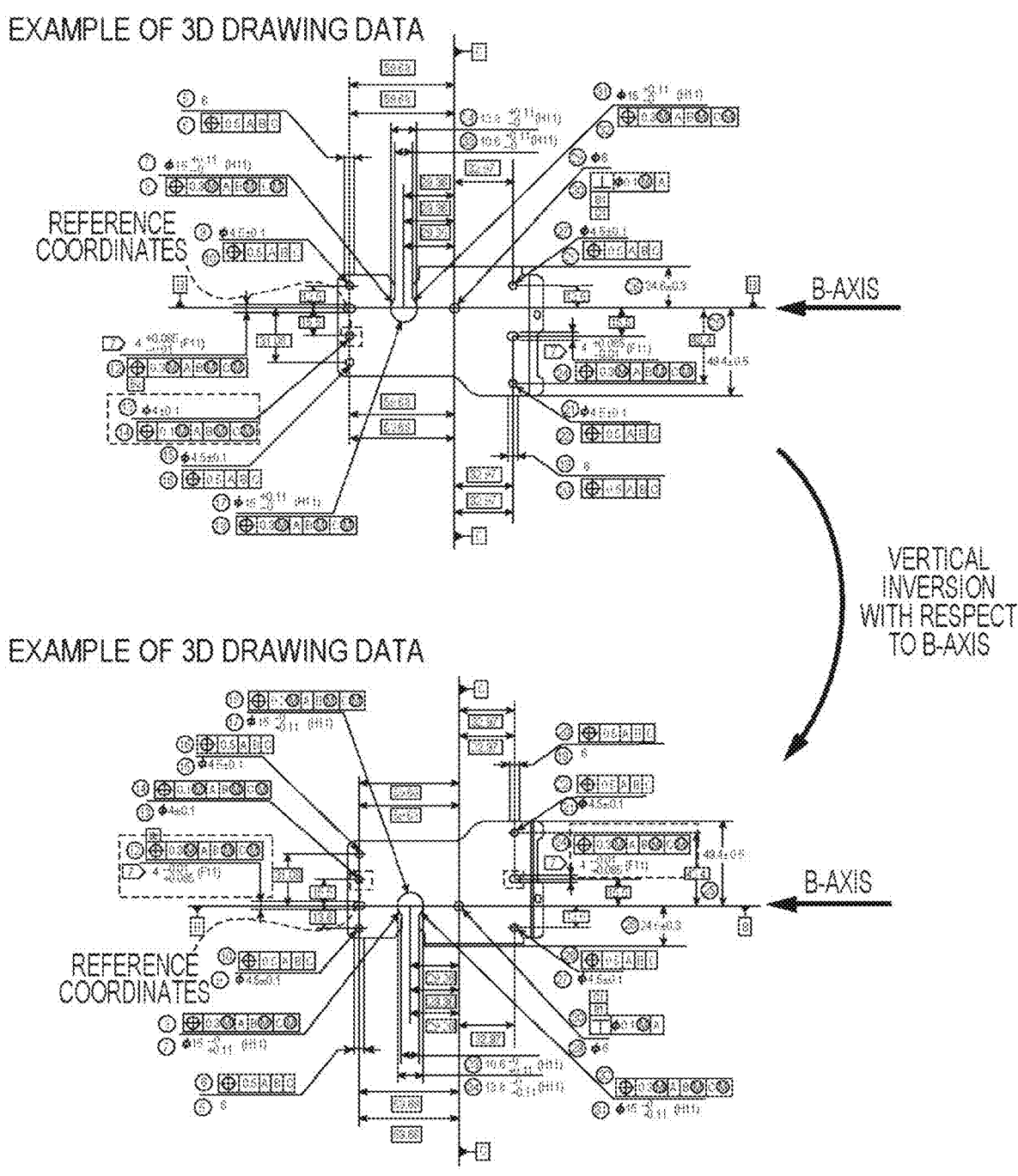
FIG. 30 is a diagram illustrating how a 3D model is vertically inverted with respect to a B-axis of datum to relatively match reference coordinates between a 2D drawing and the 3D model.

Next, the control unit 34 aligns datum directions between the 2D drawing and the 3D model and converts coordinates of the 2D drawing or the 3D model so that the reference coordinates relatively match. As illustrated in FIG. 30, for example, the control unit 34 relatively match the reference coordinates between the 2D drawing and the 3D model by vertically inverting the 3D model with respect to the B-axis as the datum.

Figure 31:
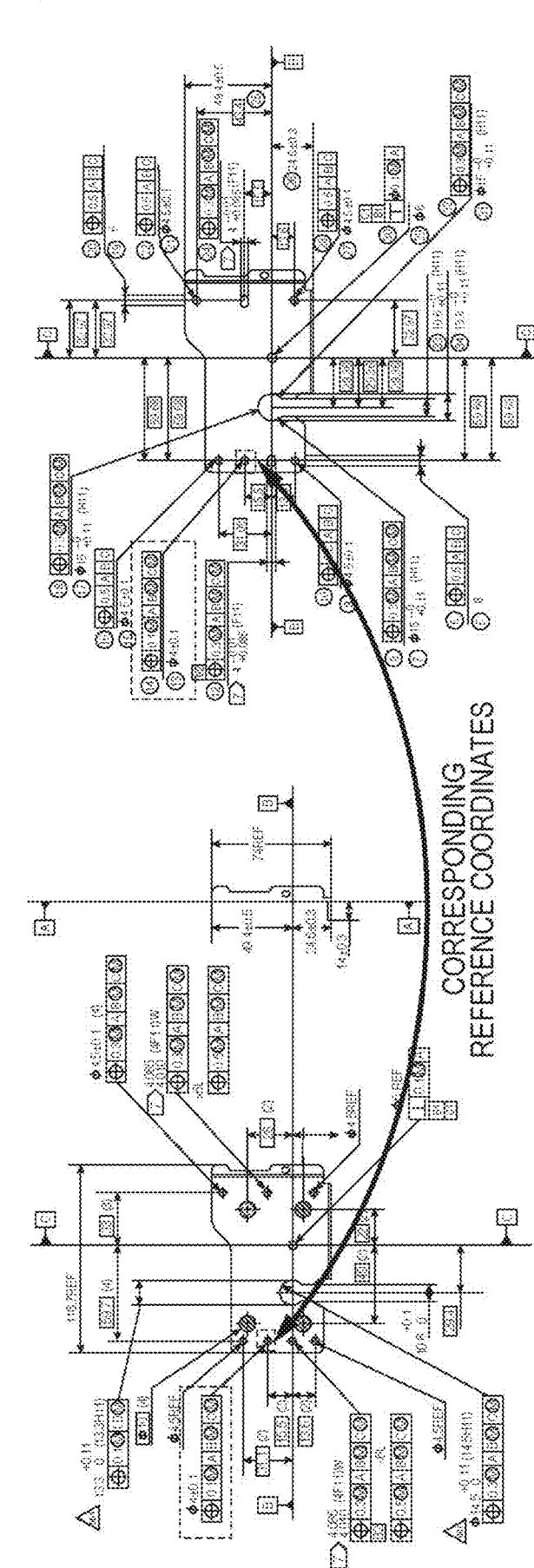
FIG. 31 is a diagram illustrating how positions of corresponding reference coordinates relative to datum axes match between the 3D model vertically inverted with respect to the B—axis and the 2D drawing.

It can be seen from FIG. 31 that positions of the corresponding reference coordinates relative to datum axes match between the 3D model vertically inverted with respect to the B-axis and the 2D drawing.

If there is a difference, between the 2D drawing and the 3D model, in the number of pieces of PMI in the identified correspondence, the control unit 34 identifies relative positions of forms indicated by PMI on the 2D drawing or in the 3D model, whichever the number of pieces of PMI in the identified correspondence is larger, and compares the relative positions with those of forms indicated by corresponding pieces of PMI to identify one-to-one correspondences.

Figure 32:
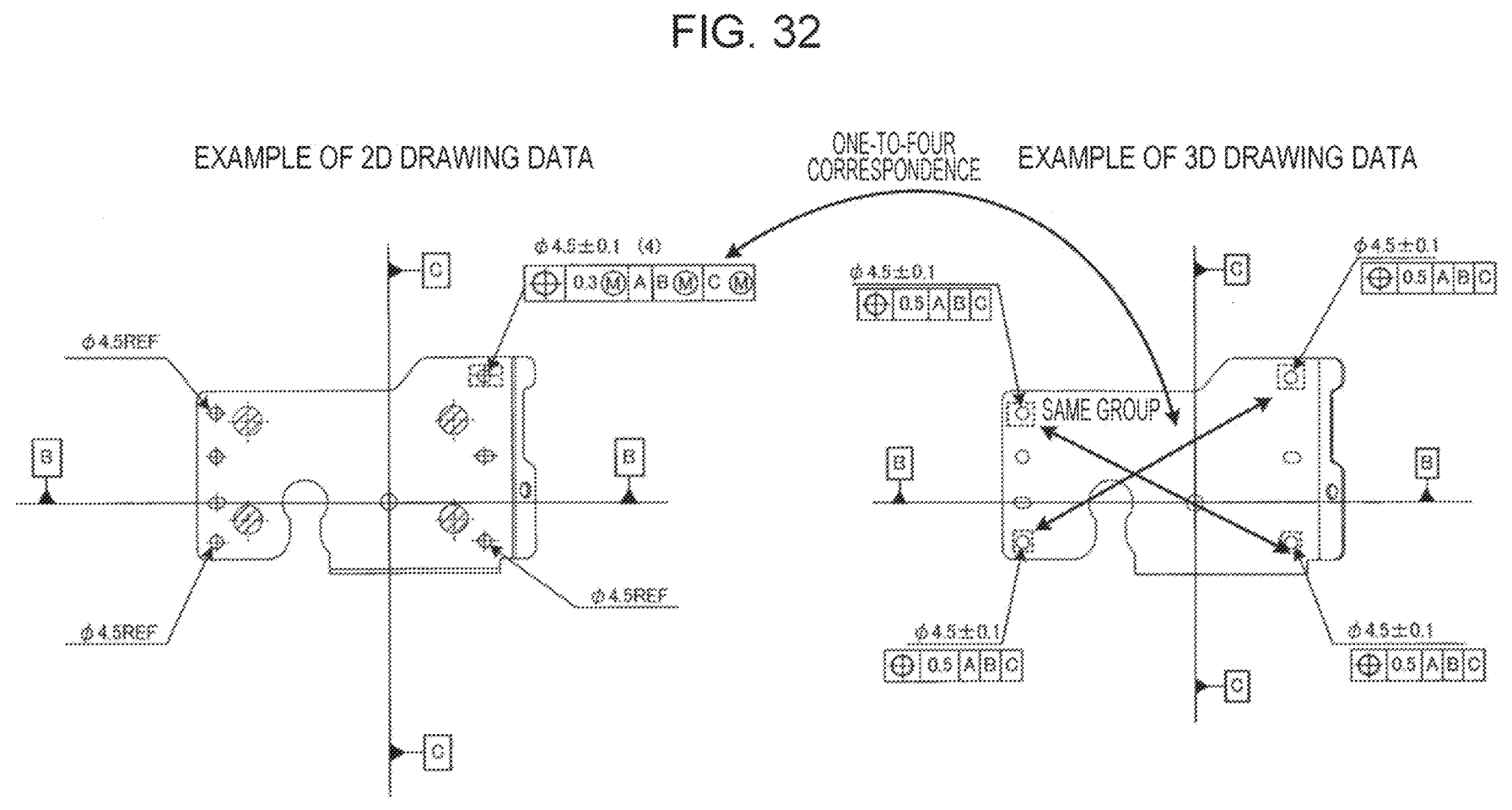

A case where, as illustrated in FIG. 32, there are parent-child relationship sets of PMI in one-to-four correspondence between a 2D drawing and a 3D model, for example, will be described. FIG. 32 illustrates a case where one parent-child relationship set of PMI on a 2D drawing and four parent-child relationship sets of PMI belonging to the same group in a 3D model are in one-to-four correspondence.

Figure 33:
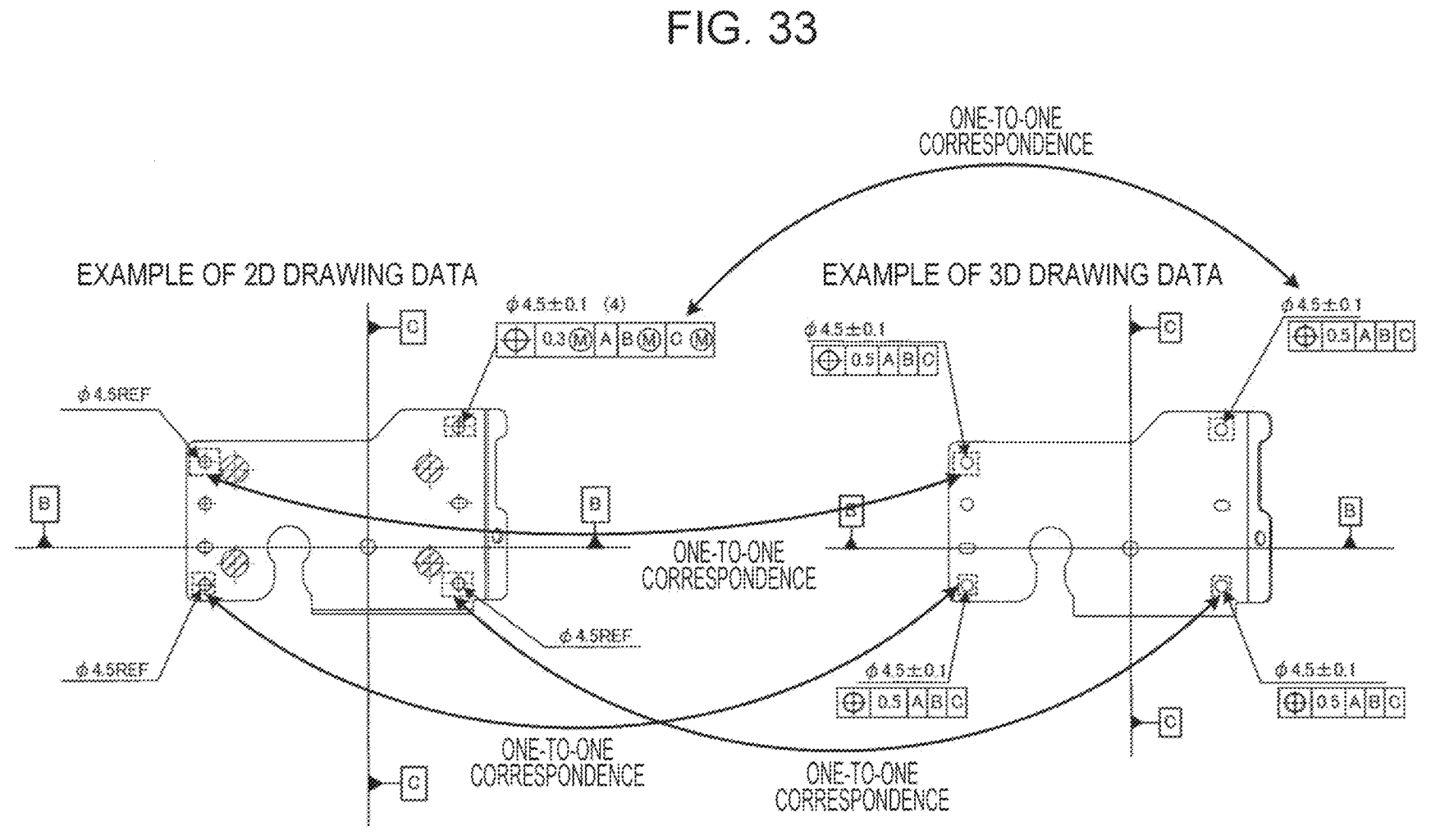

In this case, the control unit 34 identifies, on the basis of a relative positional relationship of reference coordinates, the parent-child relationship sets of PMI in one-to-four correspondence such that the parent-child relationship sets of PMI come into one-to-one correspondence. More specifically, as illustrated in FIG. 33, the control unit 34 identifies, on the basis of the parent-child relationship sets of PMI in one-to-four correspondence between the 2D drawing and the 3D model, four one-to-one correspondences. A specific process for identifying correspondences performed by the control unit 34 will be described hereinafter.

Because a size tolerance of parent PMI is "Ø4.5±0.1 (4)" on the 2D drawing, the control unit 34 recognizes that there are four such size tolerances on the 2D drawing. The control unit 34 searches the 2D drawing for the other three size tolerances and, since there three pieces of PMI "Ø4.5REF", extracts the pieces of PMI as corresponding pieces of PMI.

The control unit 34 then brings a total of four pieces of PMI, namely the three extracted pieces of PMI and the original parent-child relationship set of PMI, and four pieces of PMI in the 3D model into one-to-one correspondence.

Figure 34:
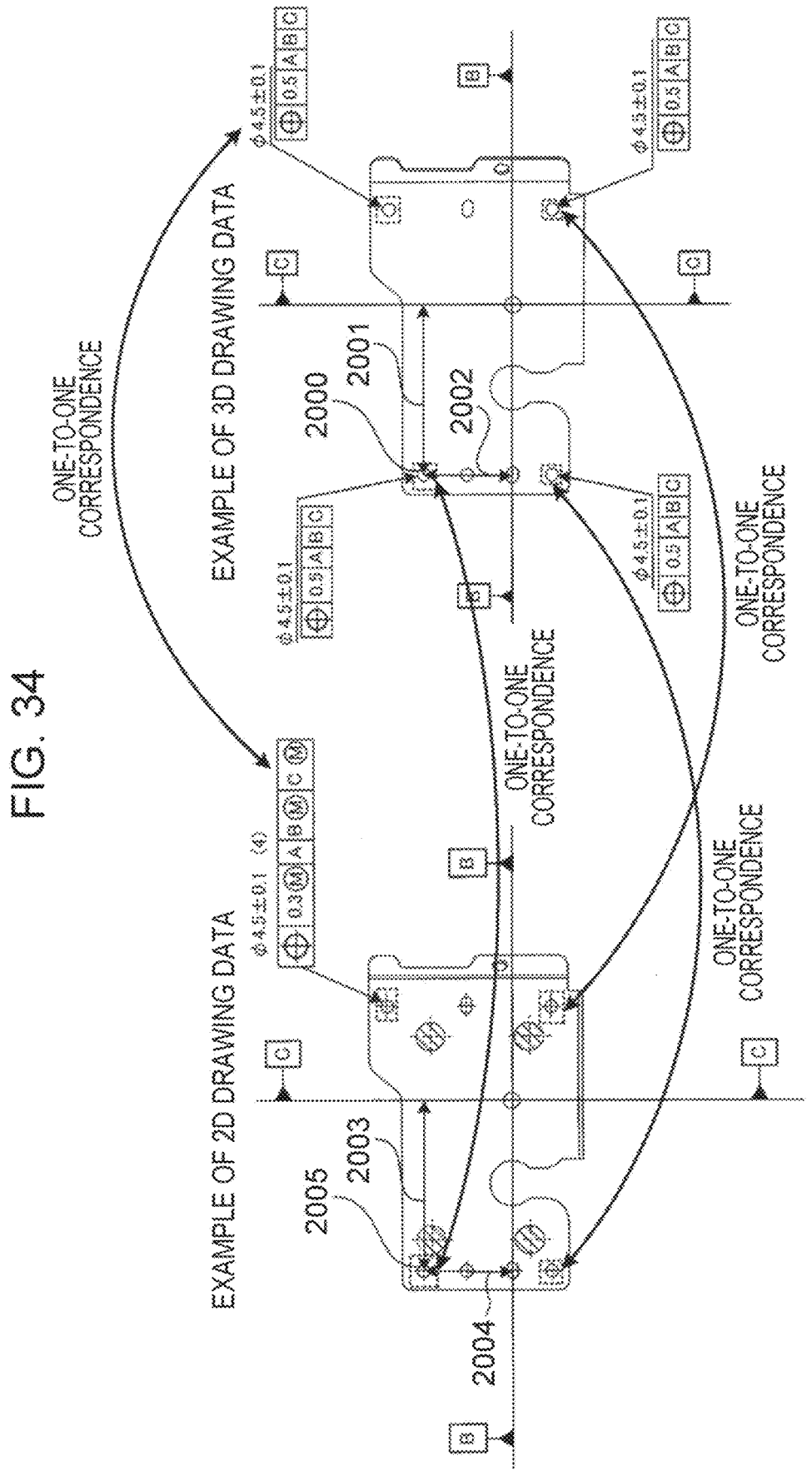
FIG. 34 is another diagram illustrating how the parent-child relationship sets of PMI in one-to-four correspondence are identified such that the parent-child relationship sets of PMI come into one-to-one correspondence.

A case where the three pieces of PMI "Ø4.5REF" are absent and there is only one piece of PMI "Ø4.5±0.1 (4)" will also be described. As illustrated in FIG. 34, when there are obviously only four holes corresponding to Ø4.5 on a drawing and there is no concern of misunderstanding, "REF" might not be provided. When a piece of PMI in two-dimensional drawing data corresponding to a piece of PMI that indicates a hole 2000 and to which "Ø4.5±0.1" is given is to be identified, for example, the control unit 34 aligns directions of views using the above-described reference coordinates, and then obtains lengths 2001 and 2002 from datum axes in three-dimensional drawing data and finds a form having the same lengths from datum axes in the two-dimensional drawing data. More specifically, the control unit 34 obtains a position at which a length from a C-axis as a datum is the same as the length 2001 and a length from a B-axis as a datum is the same as the length 2002 in the two-dimensional drawing data and determines that a hole 2005 located at the position corresponds to the hole 2000. That is, a length 2003 is the same as the length 2001, and a length 2004 is the same as the length 2002.

Figure 35:
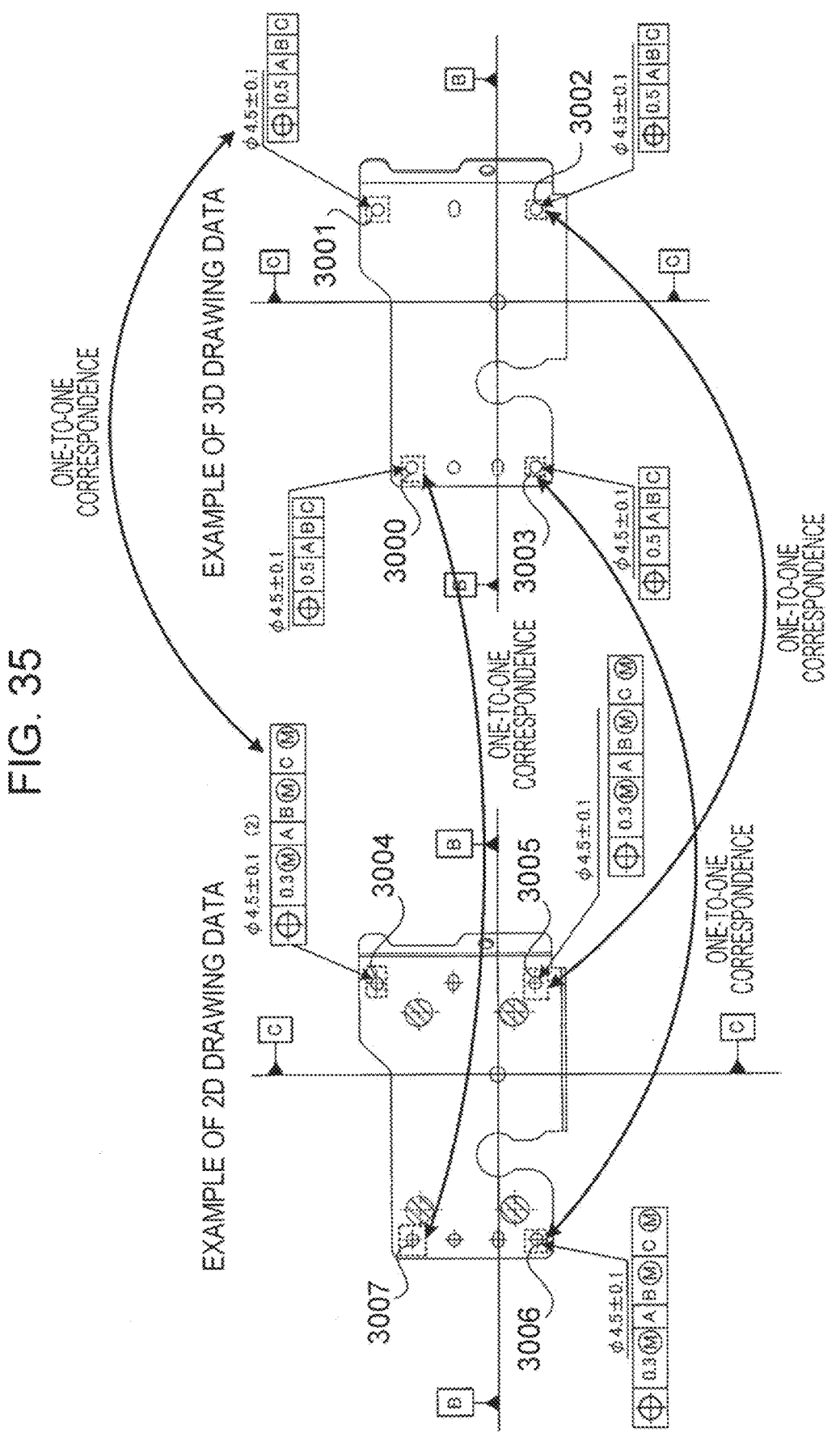
FIG. 35 is a diagram illustrating a case where many-to-many correspondence is converted into one-to-one correspondence.

FIG. 35 illustrates a case where many-to-many correspondence is converted into one-to-one correspondence. After aligning directions of views using the above-described reference coordinates, the control unit 34 can identify, as in the determination method for one-to-four correspondence, one-to-one correspondences from relative positional relationships. In three-to-four correspondence illustrated in FIG. 35, it can be seen from relative positions that holes 3001 and 3004, holes 3002 and 3005, and holes 3003 and 3006 correspond to each other. Because a piece of PMI indicating the hole 3004 in two-dimensional drawing data is "Ø4.5±0.1 (2)", it can be seen that there are a total of two holes corresponding to Ø4.5. In order to find a piece of PMI indicating a hole 3000 in three-dimensional drawing data, the control unit 34 obtains, as in the case described with reference to FIG. 34, recognizes that a hole 3007 corresponds to the hole 3000 by obtaining a length from a B-axis as a datum and a length from a C-axis as a datum in the three-dimensional drawing data and then obtaining a position in the two-dimensional drawing data corresponding to the lengths.

Figure 36:
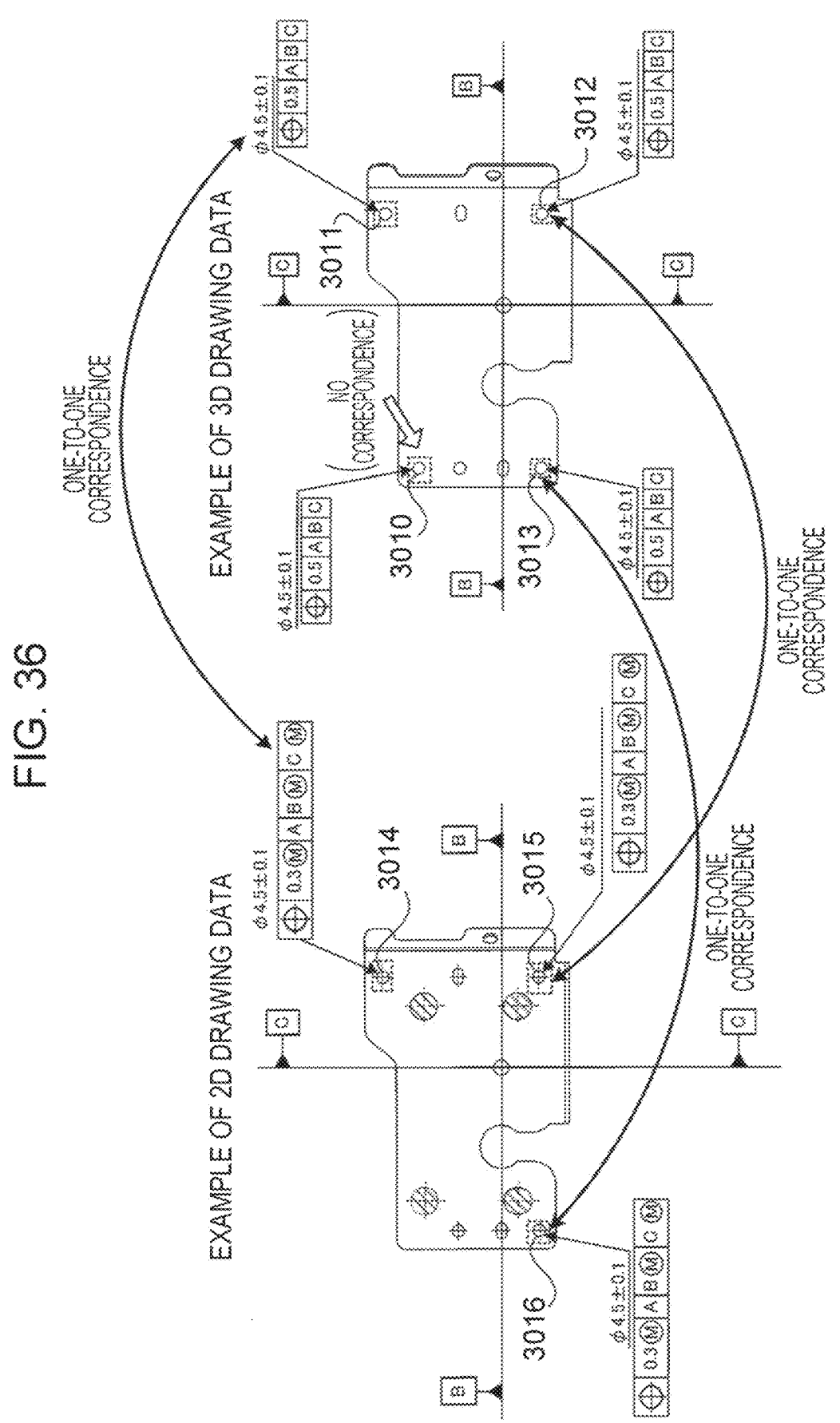
FIG. 36 is a diagram illustrating a case where there is many-to-many correspondence but there are not necessarily one-to-one correspondences.

Furthermore, FIG. 36 illustrates a case where there is many-to-many correspondence but there are not necessarily one-to-one correspondences. After aligning directions of views using the above-described reference coordinates, the control unit 34 identifies, as in the determination method for one-to-four correspondence, one-to-one correspondences from relative positional relationships. In three-to-four correspondence illustrated in FIG. 36, the control unit 34 recognizes, from relative positions, that holes 3011 and 3014, holes 3012 and 3015, and holes 3013 and 3016 correspond to each other and determines that there is no correspondence for a piece of PMI indicating a hole 3010. That is, the hole 3010 has been added to three-dimensional drawing data or removed from two-dimensional drawing data.

A reason why parent-child relationship sets of PMI are identified such that the parent-child relationship sets come into one-to-one correspondence between a 2D drawing and a 3D model will be described with reference to FIG. 37.

Figure 37:
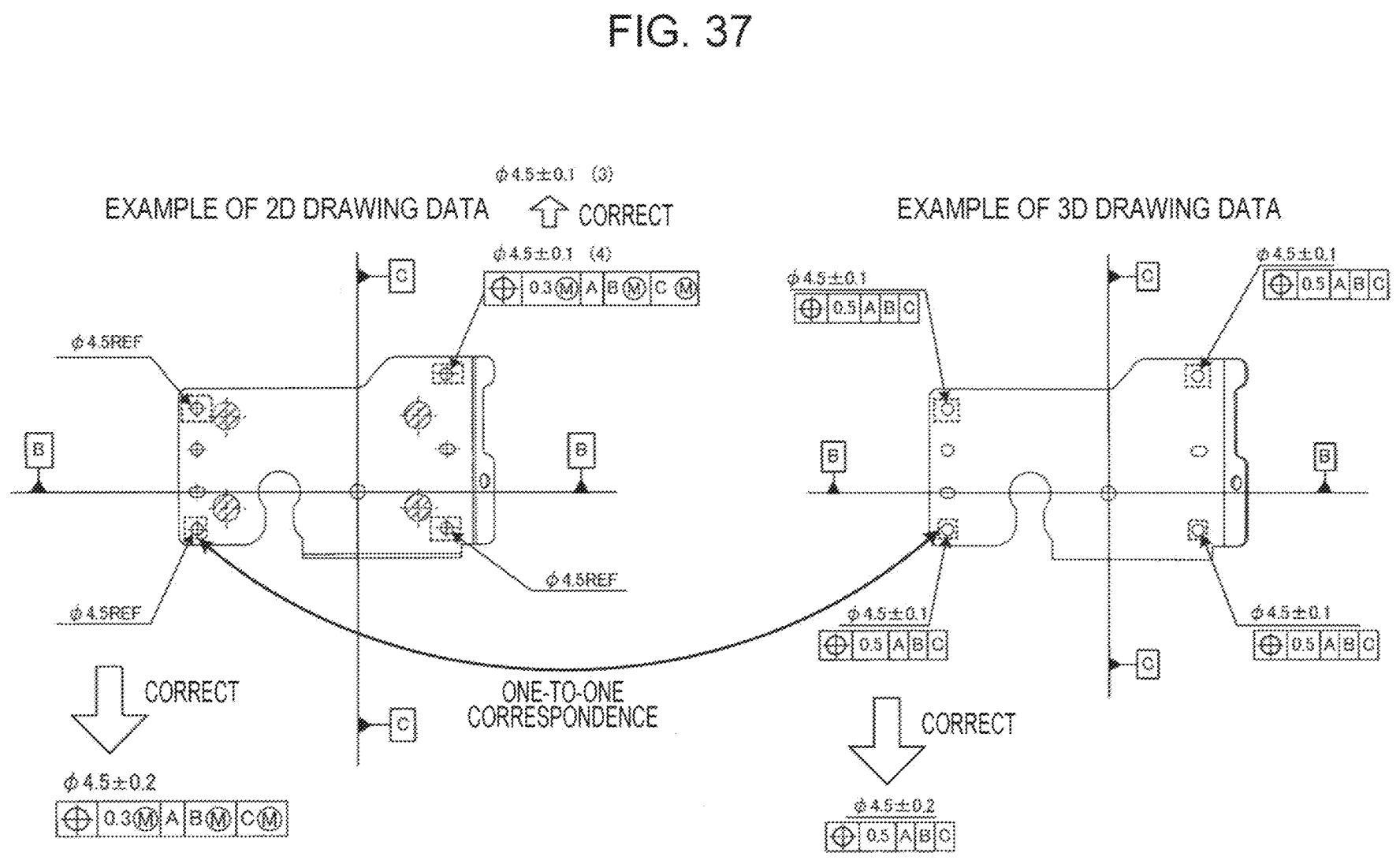

As illustrated in FIG. 37, for example, a case where one of three pieces of PMI "Ø4.5REF" on the 2D drawing is changed to a piece of PMI "Ø4.5±0.2" will be described. As a result of this change, "Ø4.5±0.1 (4)" on the 2D drawing is changed to "Ø4.5±0.1 (3)". Even after such a change, the control unit 34 can identify a piece of PMI in a 3D model corresponding to a changed piece of PMI on a 2D drawing since parent-child relationship sets of PMI are in one-to-one correspondence between the 2D drawing and the 3D model. As a result, as illustrated in FIG. 37, the corresponding piece of PMI in the 3D model can be corrected.

Even when PMI does not match between a 2D drawing and a 3D model and is not in correspondence, the control unit 34 determines that there is correspondence if the PMI is in correspondence within a predetermined tolerance. When a TED "31.1" is provided on a 2D drawing and a TED "31.08" is provided in a 3D model, for example, the control unit 34 determines that the two pieces of PMI essentially match if determining that the difference is due to a difference in the number of decimal places to be shown between a 2D drawing system and a 3D model system and that the two values are actually the same.

When an upper limit value "4.085" and a lower limit value "4.010" are provided on a 2D drawing and "4+0.085−0.01" is provided in a 3D model, for example, the control unit 34 determines that the two pieces of PMI essentially match since both the pieces of PMI mean that a reference length is "4" and that an upper tolerance limit is "0.085" and a lower tolerance limit is "0.010".

When Japanese Industrial Standards (JIS) or International Organization for Standardization (ISO) defines that a tolerance "4+0.048 0" is an H10 class for fit tolerances, for example, "H10" indicates that a reference length is "4" and that an upper tolerance limit is "0.048" and a lower tolerance limit is "0". Even if only "(H10)" is provided for a 2D drawing or a 3D model, therefore, the control unit 34 determines that two pieces of PMI essentially match.

Furthermore, the control unit 34 may visualize correspondences in PMI or parent-child relationship sets of PMI between a 2D drawing and a 3D model by changing a display mode on the 2D drawing or in the 3D model.

Figure 38:
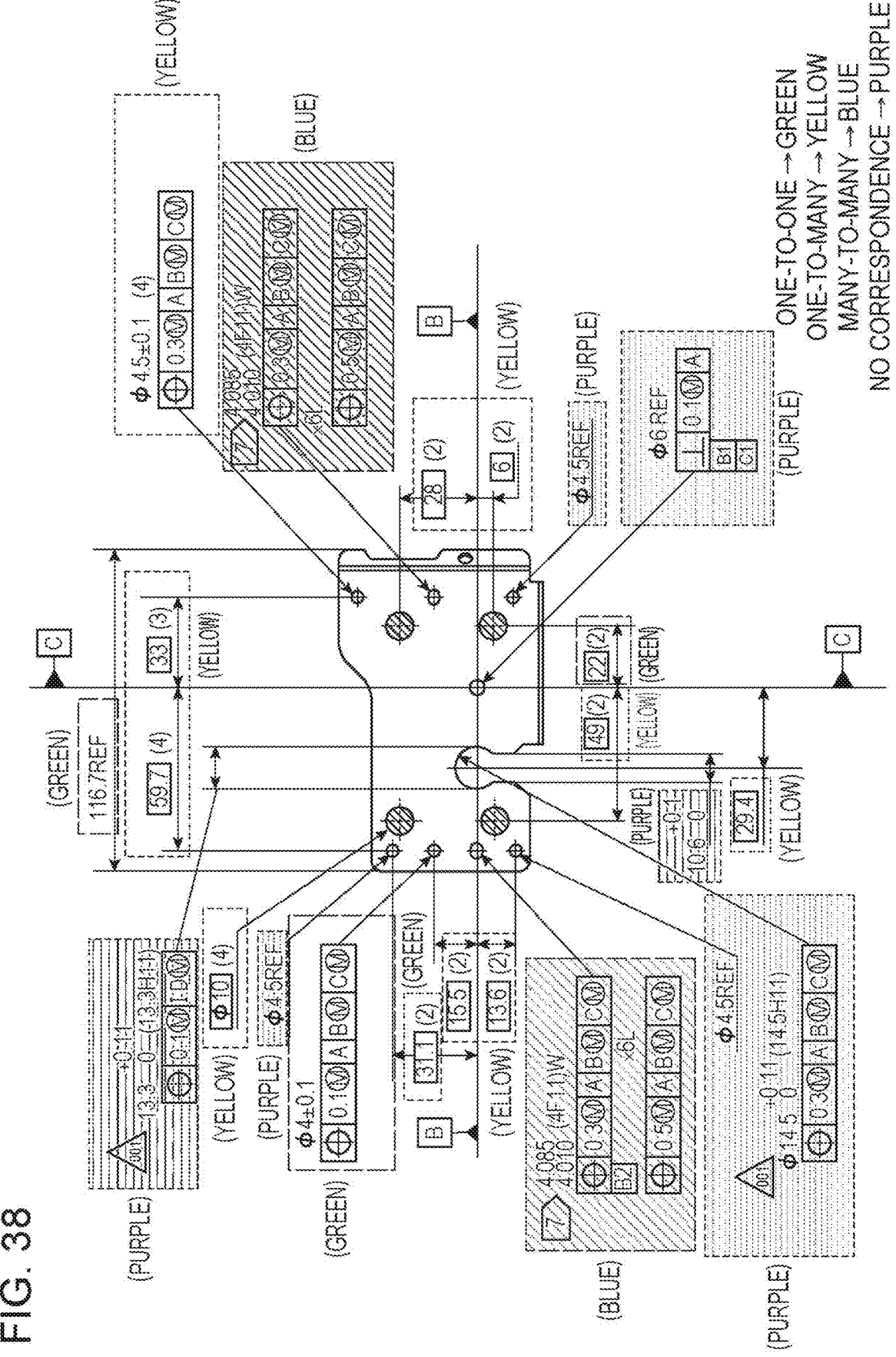
FIG. 38 is a diagram illustrating an example of a case where correspondences of PMI between a 2D drawing and a 3D model are visualized by changing display colors on the 2D drawing.

FIG. 38 illustrates an example of a case where correspondences are visualized by changing display colors on a 2D drawing. In FIG. 38, one-to-one correspondences of PMI or parent-child relationship sets of PMI between the 2D drawing and a 3D model are displayed in green, and one-to-many correspondences of PMI or parent-child relationship sets of PMI are displayed in yellow. In addition, in FIG. 38, many-to-many correspondences of PMI or parent-child relationship sets are displayed in blue, and PMI or parent-child relationship sets of PMI that are not in correspondence are displayed in purple.

Although FIG. 38 illustrates a case where a display mode of PMI on a 2D drawing is changed, a display mode of PMI in a 3D model may be changed in accordance with correspondences between pieces of PMI, instead. Alternatively, a display mode may be changed by changing display colors on a 2D drawing or in a 3D model only for pieces of PMI that do not match between the 2D drawing and the 3D model. That is, the control unit 34 may display pieces of PMI detected as differences between a 2D drawing and a 3D model in a mode different from one for other pieces of PMI.

Furthermore, the control unit 34 may change a display mode on a 2D drawing and in a 3D model depending on whether a value on the 2D drawing and the number of pieces of PMI in the 3D model match. Furthermore, the control unit 34 may change a display mode, such as by changing display colors, on a 2D drawing or in a 3D model only for pieces of PMI in one-to-one correspondence between the 2D drawing and the 3D model.

Furthermore, the control unit 34 may correct PMI in 2D drawing data or 3D model data such that differences detected between a 2D drawing and a 3D model are eliminated.

Figure 39:
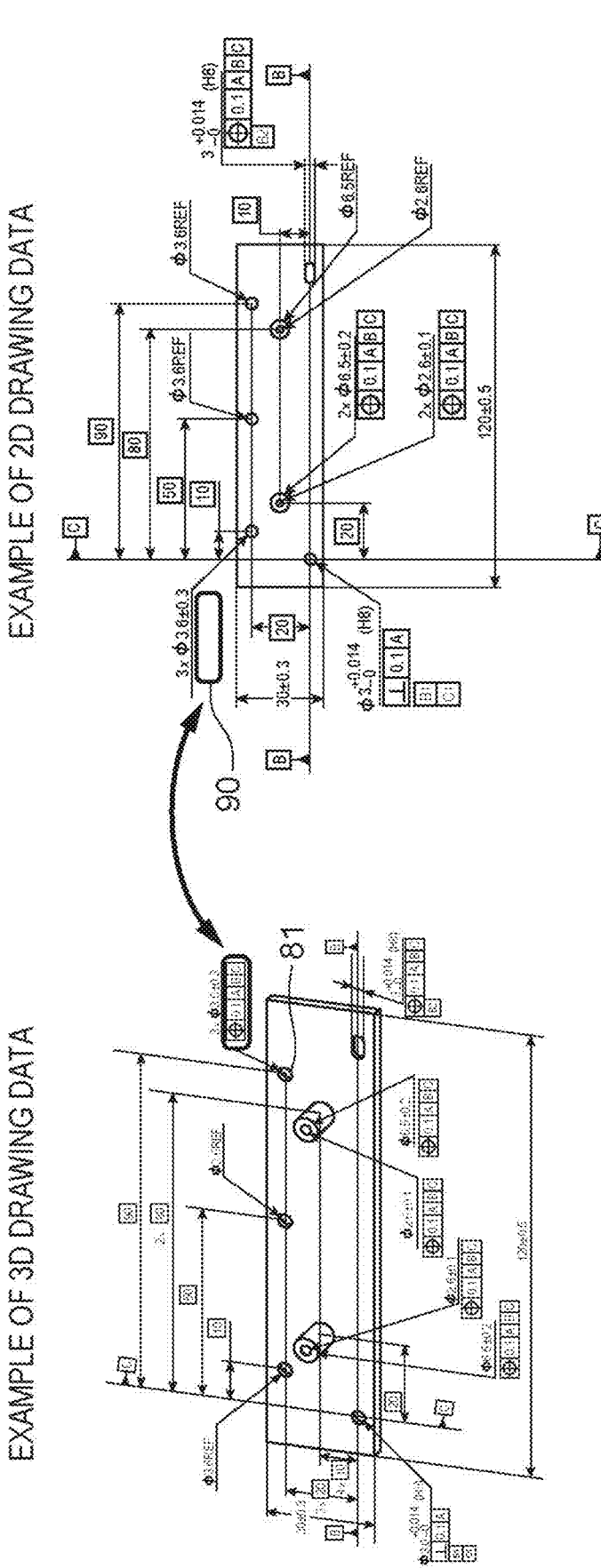
FIG. 39 is a diagram illustrating a case where a geometrical tolerance for a certain hole is missing on a 2D drawing.

FIG. 39 illustrates, for example, a case where a geometrical tolerance for a certain hole is missing on a 2D drawing. In this case, the control unit 34 automatically adds "position Ø0.1 A B C" to an area 90 on the 2D drawing illustrated in FIG. 39 as child PMI. In this case, the control unit 34 performs correction on the basis of information regarding a parent-child relationship between a size tolerance and a geometrical tolerance such that differences between the 2D drawing and a 3D model are eliminated.

More specifically, the control unit 34 may extract parent-child relationship sets of PMI having differences between 2D drawing data and 3D model data in units of parent-child relationships and add missing parent PMI or child PMI to an insufficient parent-child relationship set or remove surplus parent PMI or child PMI from an excessive parent-child relationship set. Furthermore, the control unit 34 may eliminate a difference between pieces of parent PMI or a difference between pieces of child PMI by changing one of the pieces.

The user may set in advance whether to correct 3D model data in accordance with 2D drawing data or correct 2D drawing data in accordance with 3D model data. Alternatively, when PMI in 3D model data or 2D drawing data is updated, the control unit 34 may compare a last update time of the PMI with that of corresponding PMI in the other data and correct PMI whose last update time is earlier in accordance with PMI whose last update time is later.

When the 3D model data is to be corrected in accordance with the 2D drawing data in the case illustrated in FIG. 39, the control unit 34 removes child PMI "position Ø0.1 A B C" in the 3D model.

When pieces of PMI in correspondence between a 2D drawing and a 3D model are "Ø3.6±0.3" and "Ø3.6±0.2", for example, the control unit 34 corrects one of the pieces of PMI in accordance with the other piece depending on which piece of PMI is to be used as valid data.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. An information processing apparatus comprising:
a processor configured to:
    determine a relationship between a plurality of pieces of product manufacturing information included in two-dimensional drawing data and generate, on a basis of the determined relationship, first information indicating the relationship between the plurality of pieces of product manufacturing information;
    determine a relationship between a plurality of pieces of product manufacturing information included in three-dimensional drawing data and generate, on a basis of the determined relationship, second information indicating the relationship between the plurality of pieces of product manufacturing information; and
    detect a difference between the first information and the second information by identifying correspondence between the first information and the second information, wherein
the processor is configured to identify, if there is a difference, between the first information and the second information, in a number of pieces of product manufacturing information included in the identified correspondence, relative positions of forms indicated by product manufacturing information included in the two-dimensional drawing data or the three-dimensional drawing data, whichever the number of pieces of product manufacturing information in the identified correspondence is larger, and then identify one-to-one correspondence by comparing the relative positions with relative positions of forms indicated by product manufacturing information included in another of the two-dimensional drawing data and the three-dimensional drawing data, and
the processor is configured to bring, if product manufacturing information is in one-to-many, many-to-one, or many-to-many correspondence between the first information and the second information, the product manufacturing information into one-to-one correspondence between the first information and the second information by converting coordinates of a two-dimensional drawing or a three-dimensional model such that reference coordinates, which are coordinates of product manufacturing information in one-to-one correspondence between the first information and the second information, of the two-dimensional drawing and the three-dimensional model relatively match.
2. The information processing apparatus according to claim 1,
wherein the processor is configured to determine that there is a relationship between first product manufacturing information and second product manufacturing information indicating a form indicated by the first product manufacturing information and generate information indicating that there is a parent-child relationship between the first product manufacturing information and the second product manufacturing information, and
wherein the processor is configured to determine that there is correspondence if product manufacturing information indicated by the first information and the second information matches in units of parent-child relationships.

3. The information processing apparatus according to claim 2,
wherein the processor is configured to determine that there is correspondence if the product manufacturing information indicated by the first information and the second information is in one-to-one, one-to-many, many-to-one, or many-to-many correspondence.
4. The information processing apparatus according to claim 2,
wherein the processor is configured to determine that, as the first information or the second information, there is a relationship between a piece of product manufacturing information that defines a geometrical tolerance and a piece of product manufacturing information that defines a theoretically exact dimension indicating a form indicated by the geometrical tolerance and generate information indicating a parent-child relationship where the piece of product manufacturing information that defines the geometrical tolerance is a parent and the piece of product manufacturing information that defines the theoretically exact dimension is a child.
5. The information processing apparatus according to claim 2,
wherein the processor is configured to determine that, as the first information or the second information, there is a relationship between a piece of product manufacturing information that defines a geometrical tolerance or a piece of product manufacturing information that defines a size tolerance and a piece of product manufacturing information that defines supplementary information regarding the piece of product manufacturing information that defines the geometrical tolerance or the size tolerance and generate information indicating a parent-child relationship where the piece of product manufacturing information that defines the geometrical tolerance or the size tolerance is a parent and the piece of product manufacturing information that defines the supplementary information is a child.
6. The information processing apparatus according to claim 1,
wherein the processor is configured to determine, even when product manufacturing information does not match between the first information and the second information and is not in correspondence, that there is correspondence between the first information and the second information if the product manufacturing information is in correspondence within a predetermined tolerance.
7. The information processing apparatus according to claim 1,
wherein the processor is configured to determine that, as the first information or the second information, there is correspondence between at least two pieces of product manufacturing information indicating forms whose defined geometrical tolerances or size tolerances are the same and generate information indicating that there is correspondence between the at least two pieces of product manufacturing information.
8. The information processing apparatus according to claim 1,
wherein the processor is configured to determine that, as the first information or the second information, a plurality of sets of product manufacturing information determined to be in correspondence belong to a same group and generate information indicating that the plurality of sets of product manufacturing information belong to the same group.

9. The information processing apparatus according to claim 1, wherein the processor is configured to determine that, as the first information or the second information, at least two pieces of product manufacturing information that define a same size tolerance or at least two pieces of product manufacturing information that define a same geometrical tolerance belong to a same group and generate information indicating that the at least two pieces of product manufacturing information belong to the same group.

10. The information processing apparatus according to claim 1, wherein the processor is configured to display a piece of product manufacturing information detected as the difference between the first information and the second information on the two-dimensional drawing or in the three-dimensional model in a display mode different from a display mode for other pieces of product manufacturing information.

11. The information processing apparatus according to claim 1, wherein the processor is configured to correct a piece of product manufacturing information included in the two-dimensional drawing data or the three-dimensional drawing data such that the difference detected between the first information and the second information is eliminated.

12. A non-transitory computer readable medium storing a program causing a computer to execute a process comprising:

determining a relationship between a plurality of pieces of product manufacturing information included in two-dimensional drawing data and generating, on a basis of the determined relationship, first information indicating the relationship between the plurality of pieces of product manufacturing information;

determining a relationship between a plurality of pieces of product manufacturing information included in three-dimensional drawing data and generating, on a basis of the determined relationship, second information indicating the relationship between the plurality of pieces of product manufacturing information; and detecting a difference between the first information and the second information by identifying correspondence between the first information and the second information, wherein the process further comprises:

identifying, if there is a difference, between the first information and the second information, in a number of pieces of product manufacturing information included in the identified correspondence, relative positions of forms indicated by product manufacturing information included in the two-dimensional drawing data or the three-dimensional drawing data, whichever the number of pieces of product manufacturing information in the identified correspondence is larger, and then identifying one-to-one correspondence by comparing the relative positions with relative positions of forms indicated by product manufacturing information included in another of the two-dimensional drawing data and the three-dimensional drawing data; and bringing, if product manufacturing information is in one-to-many, many-to-one, of many-to-many correspondence between the first information and the second information, the product manufacturing information into one-to-one correspondence between the first information and the second information by converting coordinates of a two-dimensional drawing or a three-dimensional model such that reference coordinates, which are coordinates of product manufacturing information in one-to-one correspondence between the first information and the second information, of the two-dimensional drawing and the three-dimensional model relatively match.

13. A method comprising:

determining a relationship between a plurality of pieces of product manufacturing information included in two-dimensional drawing data and generating, on a basis of the determined relationship, first information indicating the relationship between the plurality of pieces of product manufacturing information;

determining a relationship between a plurality of pieces of product manufacturing information included in three-dimensional drawing data and generating, on a basis of the determined relationship, second information indicating the relationship between the plurality of pieces of product manufacturing information; and detecting a difference between the first information and the second information by identifying correspondence between the first information and the second information, wherein the method further comprises:

identifying, if there is a difference, between the first information and the second information, in a number of pieces of product manufacturing information included in the identified correspondence, relative positions of forms indicated by product manufacturing information included in the two-dimensional drawing data or the three-dimensional drawing data, whichever the number of pieces of product manufacturing information in the identified correspondence is larger, and then identifying one-to-one correspondence by comparing the relative positions with relative positions of forms indicated by product manufacturing information included in another of the two-dimensional drawing data and the three-dimensional drawing data; and bringing, if product manufacturing information is in one-to-many, many-to-one or many-to-many correspondence between the first information and the second information, the product manufacturing information into one-to-one correspondence between the first information and the second information by converting coordinates of a two-dimensional drawing or a three-dimensional model such that reference coordinates, which are coordinates of product manufacturing information in one-to-one correspondence between the first information and the second information, of the two-dimensional drawing and the three-dimensional model relatively match.

* * * * *